United States Patent
Matsuda et al.

(10) Patent No.: US 12,250,023 B2
(45) Date of Patent: Mar. 11, 2025

(54) OPTICAL SPACE COMMUNICATIONS TRANSMISSION AND RECEPTION TERMINAL AND OPTICAL SPACE COMMUNICATIONS SYSTEM

(71) Applicant: Mitsubishi Electric Corporation, Tokyo (JP)

(72) Inventors: Keisuke Matsuda, Tokyo (JP); Tsuyoshi Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 203 days.

(21) Appl. No.: 18/192,716

(22) Filed: Mar. 30, 2023

(65) Prior Publication Data

US 2023/0254040 A1  Aug. 10, 2023

Related U.S. Application Data

(63) Continuation of application No. PCT/JP2020/045909, filed on Dec. 9, 2020.

(51) Int. Cl.
*H04B 10/112* (2013.01)
*H04B 10/118* (2013.01)

(52) U.S. Cl.
CPC ........ *H04B 10/1123* (2013.01); *H04B 10/118* (2013.01)

(58) Field of Classification Search
CPC .......................... H04B 10/1123; H04B 10/118
(Continued)

(56) References Cited

U.S. PATENT DOCUMENTS

| 8,315,526 B2 * | 11/2012 | Tan | H04B 10/803 398/118 |
| 8,526,825 B2 * | 9/2013 | Yamada | H04B 10/116 398/189 |

(Continued)

FOREIGN PATENT DOCUMENTS

| JP | 2000-244410 A | 9/2000 |
| JP | WO2014/136421 A1 | 9/2014 |

(Continued)

OTHER PUBLICATIONS

A. Viterbi et al., "Nonlinear Estimation of PSK-Modulated Carrier Phase with Application to Burst Digital Transmission", IEEE Transactions on Information Theory, vol. 29 No. 4, Jul. 1983, pp. 543-551.

(Continued)

*Primary Examiner* — Abbas H Alagheband
(74) *Attorney, Agent, or Firm* — Birch, Stewart, Kolasch & Birch, LLP

(57) ABSTRACT

An optical space communications transmission and reception terminal includes: an optical transceiver to convert transmission data into a transmission optical signal modulated at a symbol rate synchronized with a transmission clock signal and output it, and generate received data from a reception optical signal; an intensity modulation unit to generate an intensity-modulated transmission optical signal; a transmission clock source to supply a transmission clock signal; a fiber coupling unit) to output the intensity-modulated transmission optical signal as collimated light and couple the input optical signal to an optical fiber; an optical fiber amplifier to amplify the optical signal coupled to the optical fiber; a tracking mirror to output the optical signal to the fiber coupling unit and output the transmission optical signal to space; and an angle sensor to output a clock signal (Continued)

extracted from the optical signal divided by a beam splitter to the optical transceiver.

14 Claims, 10 Drawing Sheets

(58) Field of Classification Search
USPC .......................................................... 398/130
See application file for complete search history.

(56) References Cited

U.S. PATENT DOCUMENTS

| | | | | |
|---|---|---|---|---|
| 10,454,577 | B2 * | 10/2019 | Takahashi | ............ H04B 10/118 |
| 2013/0216229 | A1 * | 8/2013 | Cvijetic | ........... H04B 10/25753 |
| | | | | 398/66 |
| 2014/0294399 | A1 * | 10/2014 | Makowski | ........... H04B 10/118 |
| | | | | 398/126 |
| 2016/0013882 | A1 * | 1/2016 | Hashimoto | ........ H04B 10/1123 |
| | | | | 398/65 |
| 2021/0067248 | A1 * | 3/2021 | Nykolak | .............. H04B 10/118 |
| 2021/0075517 | A1 * | 3/2021 | Matsuda | ................ H04B 10/61 |
| 2021/0384985 | A1 * | 12/2021 | Matsuda | .............. H04B 10/532 |

FOREIGN PATENT DOCUMENTS

| | | | | |
|---|---|---|---|---|
| WO | WO-2016042535 | A1 * | 3/2016 | .......... H04B 10/532 |
| WO | WO 2019/167237 | A1 | 9/2019 | |
| WO | WO-2020105143 | A1 * | 5/2020 | |
| WO | WO-2020188766 | A1 * | 9/2020 | ......... H04B 10/1127 |

OTHER PUBLICATIONS

A.Leven et al., "Frequency Estimation in Intradyne Reception", IEEE Photonics Technology Letters, vol. 19 No. 6, Mar. 15, 2007 pp. 366-368.

H. Hauschildt et al., "HydRON: High thRoughput Optical Network," 2019 IEEE International Conference on Space Optical Systems and Applications (ICSOS), Portland, OR, USA, 2019, 6 pages.

Extended European Search Report for European Application No. 20965086.0, dated Dec. 8, 2023.

* cited by examiner

OPTICAL SPACE COMMUNICATIONS TRANSMISSION AND RECEPTION TERMINAL AND OPTICAL SPACE COMMUNICATIONS SYSTEM

This application is a Continuation Application of PCT International Application No. PCT/JP2020/045909, filed on Dec. 9, 2020, all of which is hereby expressly incorporated by reference into the present application.

TECHNICAL FIELD

The present disclosure relates to an optical space communications transmission and reception terminal and an optical space communications system.

BACKGROUND ART

Since optical space communications have characteristics that downsizing of a transceiver can be expected and low power consumption can be expected, application to a feeder link in a next-generation satellite communication network has been studied (See, for example, Non-Patent Literature 1). An optical fiber amplifier is used for a transceiver in optical space communications in order to improve reception sensitivity. The optical fiber amplifier is an amplifier that amplifies an optical signal coupled to the optical fiber. The optical signal amplified by the optical fiber amplifier is output to the optical transceiver. The optical transceiver extracts a clock signal corresponding to a symbol rate from the optical signal amplified by the optical fiber amplifier, and samples a received optical signal in synchronization with the extracted clock signal, thereby performing demodulation processing of the received optical signal.

CITATION LIST

Non-Patent Literature

Non-Patent Literature 1: H. Hauschildt et al., "HydRON: High thRoughput Optical Network" 2019 IEEE International Conference on Space Optical Systems and Applications (ICSOS), Portland, OR, USA, 2019.

SUMMARY OF INVENTION

Technical Problem

In order to use an optical fiber amplifier, it is necessary to condense an optical signal propagated in the atmosphere to be coupled to the optical fiber. However, since the wavefront of the optical signal propagated in the atmosphere is distorted due to the influence of atmospheric fluctuations, loss occurs when the optical signal is coupled to the optical fiber. As a result, a signal noise ratio (SNR) of the received optical signal amplified by the optical fiber amplifier decreases. Furthermore, since the loss of the optical signal generated at the time of coupling to the optical fiber fluctuates with atmospheric fluctuations, the SNR of the received optical signal also fluctuates with time.

When the SNR of the received optical signal fluctuates with time and falls below the SNR necessary for extracting the clock signal, the optical transceiver cannot extract the clock signal from the received optical signal, and the communication is disabled. In this case, the conventional optical space communications system has a problem that communication cannot be recovered until a clock signal is extracted from the received optical signal amplified by the optical fiber amplifier after the SNR of the received optical signal is recovered. Note that the communication capacity of the optical space communications decreases as it takes time to recover the communications.

The present disclosure solves the above problem, and an object of the present disclosure is to provide an optical space communications transmission and reception terminal and an optical space communications system capable of extracting a clock signal without waiting for recovery of an SNR of a received optical signal when communication is disabled due to a decrease in the SNR of the received optical signal caused by a loss generated when the optical signal is coupled to an optical fiber.

Solution to Problem

An optical space communications transmission and reception terminal according to the present disclosure is an optical space communications transmission and reception terminal that performs bidirectional communication with a pair of optical space communications transmission and reception terminals having a same configuration, the optical space communications transmission and reception terminal comprising:

an optical transceiver to convert transmission data into a transmission optical signal modulated at a symbol rate synchronized with a transmission clock signal and output the transmission optical signal, and generate received data by demodulating and decoding a signal obtained by sampling a received optical signal at a cycle synchronized with a reception clock signal; an intensity modulator to generate a transmission optical signal obtained by superimposing a transmission clock signal on the transmission optical signal output from the optical transceiver and performing intensity modulation, and output the generated transmission optical signal; a transmission clock source to supply a common transmission clock signal to the optical transceiver and the intensity modulator;

a fiber coupler to output an intensity-modulated transmission optical signal as collimated light and couple the input optical signal to an optical fiber;

an optical fiber amplifier to amplify an optical signal coupled to the optical fiber by the fiber coupler and output the amplified optical signal to the optical transceiver as a received optical signal; a tracking mirror to output an optical signal propagated in space to a side of the fiber coupler, output the transmission optical signal collimated by the fiber coupler to the space, and output, when a propagation angle error is input, an optical signal in which a propagation angle is corrected on a basis of the input propagation angle error; a beam splitter to divide a part of an optical signal propagating between the tracking mirror and the fiber coupler; and an angle sensor to output a propagation angle error detected from the optical signal divided by the beam splitter to the tracking mirror, and output a clock signal extracted from the optical signal divided by the beam splitter to the optical transceiver as a reception clock signal.

Advantageous Effects of Invention

According to the present disclosure, an angle sensor extracts a clock signal from an optical signal before being coupled to an optical fiber. As a result, the optical space communications transmission and reception terminal according to the present disclosure can extract the clock signal without waiting for recovery of the SNR of the received optical signal when communication is disabled due to a decrease in the SNR of the received optical signal caused by a loss generated when the optical signal is coupled to the optical fiber. As a result, the time until the communication is recovered can be shortened as compared with a case where the clock signal is extracted after the recovery of the SNR of the received optical signal.

DESCRIPTION OF EMBODIMENTS

First Embodiment

Figure 1:
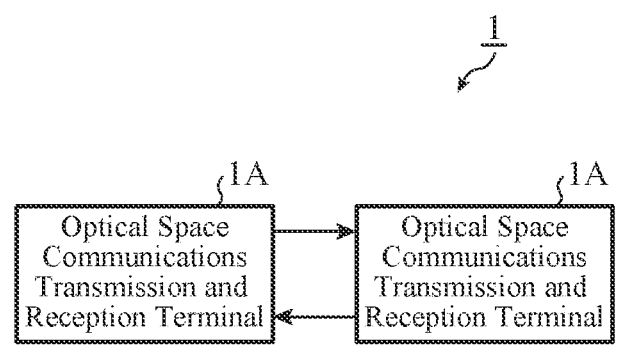
FIG. 1 is a block diagram illustrating a configuration of an optical space communications system according to a first embodiment.

FIG. 1 is a block diagram illustrating a configuration of an optical space communications system 1 according to a first embodiment. In FIG. 1, the optical space communications system 1 is a system that performs communication using light propagating in space, and includes a pair of optical space communications transmission and reception terminals 1A. In the optical space communications system 1, as illustrated in FIG. 1, the optical space communications transmission and reception terminal 1A performs bidirectional communication with a paired optical space communications transmission and reception terminal 1A having the same configuration.

Figure 2:
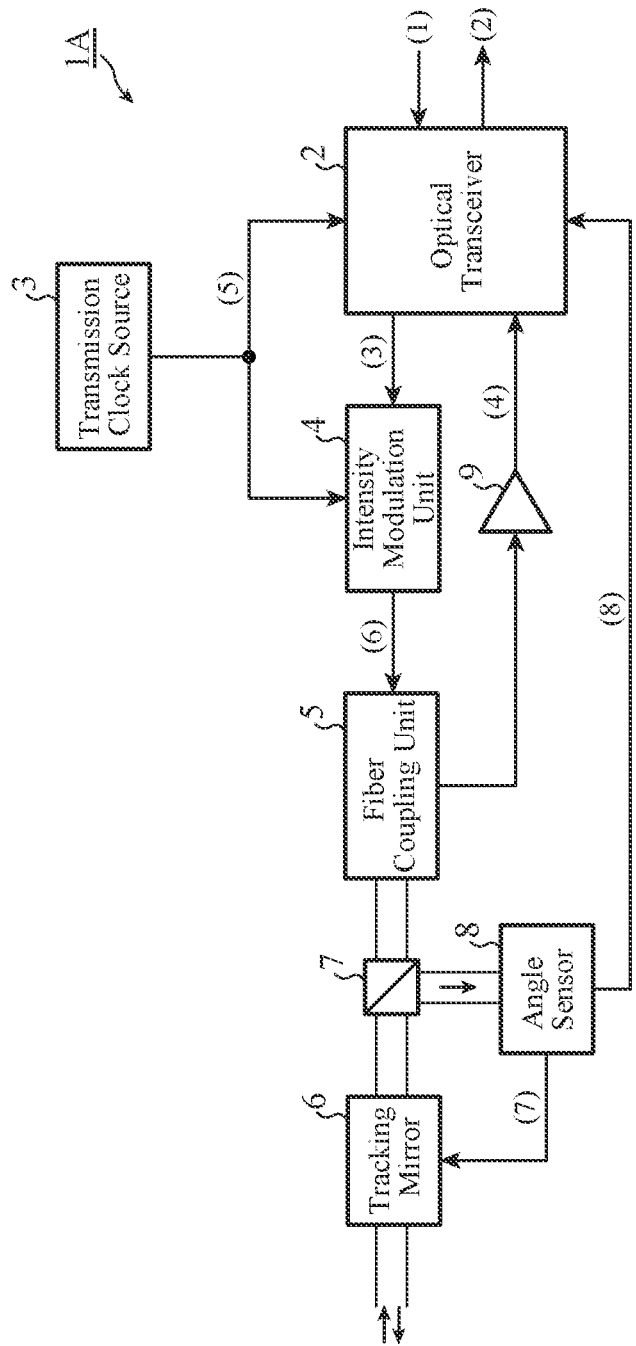
FIG. 2 is a block diagram illustrating a configuration of an optical space communications transmission and reception terminal according to the first embodiment.

FIG. 2 is a block diagram illustrating a configuration of the optical space communications transmission and reception terminal 1A. The optical space communications transmission and reception terminal 1A includes an optical transceiver 2, a transmission clock source 3, an intensity modulation unit 4, a fiber coupling unit 5, a tracking mirror 6, a beam splitter 7, an angle sensor 8, and an optical fiber amplifier 9. The optical transceiver 2, the intensity modulation unit 4, the fiber coupling unit 5, and the optical fiber amplifier 9 are connected to each other by an optical fiber. Further, the optical transceiver 2, the transmission clock source 3, the tracking mirror 6, and the angle sensor 8 are connected to each other by signal lines.

The optical transceiver 2 converts transmission data (1) into a transmission optical signal (3) modulated at a symbol rate synchronized with a transmission clock signal (5) and outputs the transmission optical signal (3). In addition, the optical transceiver 2 samples a received optical signal (4) at a cycle synchronized with a reception clock signal (8), and generates received data (2) by demodulating and decoding the sampled signal.

The transmission clock source 3 supplies a common transmission clock signal (5) to the optical transceiver 2 and the intensity modulation unit 4. When the transmission clock source 3 outputs the transmission clock signal (5) having a frequency of 100 MHz, the optical transceiver 2 multiplies the frequency of the transmission clock signal (5) by, for example, 20 to generate a transmission optical signal (3) modulated at a symbol rate of 2 GHz.

The intensity modulation unit 4 superimposes the transmission clock signal (5) on the transmission optical signal (3) output from the optical transceiver 2 to generate an intensity-modulated transmission optical signal (3), and outputs an intensity-modulated transmission optical signal (6) to the fiber coupling unit 5. For example, the intensity modulation unit 4 is an intensity modulator that superimposes the transmission clock signal (5) as a modulation signal on the transmission optical signal (3). In intensity modulation processing of the transmission optical signal, the intensity modulation unit 4 prevents the modulation amplitude from being small and the intensity of the transmission optical signal (3) from greatly fluctuating. As a result, it is possible to reduce the influence of the fluctuation in the intensity of the intensity-modulated transmission optical signal (3) on the modulation and demodulation processing of the optical signal performed by the optical transceiver 2.

Figure 3:
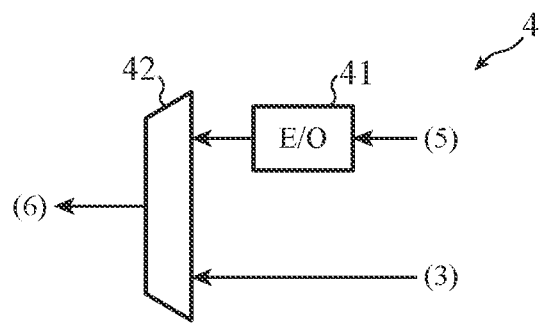
FIG. 3 is a block diagram illustrating a configuration example of an intensity modulation unit.

The intensity modulation unit 4 has, for example, a configuration illustrated in FIG. 3. FIG. 3 is a block diagram illustrating a configuration example of the intensity modulation unit 4. The intensity modulation unit 4 includes an electro-optical converter 41 and an optical multiplexer 42. The electro-optical converter 41 is "E/O" in FIG. 3. The electro-optical converter 41 converts the transmission clock signal (5) supplied from the transmission clock source 3 from an electrical signal into an optical signal.

The optical multiplexer 42 multiplexes the transmission optical signal (3) output from the optical transceiver 2 and the transmission clock signal converted into the optical signal by the electro-optical converter 41. As a result, the transmission clock signal (5) is superimposed on the transmission optical signal (3), and the intensity of the transmission optical signal (3) is modulated. Note that, the transmission clock signal (5) converted into the optical signal is an optical signal having a wavelength different from that of the transmission optical signal (3). That is, the transmission optical signal (6) intensity-modulated by the optical multiplexer 42 is a signal in which signals having different wavelengths are wavelength-multiplexed. The transmission optical signal (6) is output from the optical multiplexer 42 to the fiber coupling unit 5.

The fiber coupling unit 5 outputs the transmission optical signal (6) intensity-modulated by the intensity modulation unit 4 as collimated light (parallel light), and couples the optical signal input from the tracking mirror 6 side to the optical fiber. For example, the fiber coupling unit 5 includes a condensing lens that condenses the optical signal from the tracking mirror 6, and an optical system holder that holds the condensing lens and the optical fiber. The optical fiber held by the optical system holder is connected to the input side of the optical fiber amplifier 9. The optical signal from the tracking mirror 6 is condensed by the condensing lens and is incident on the optical fiber.

When an optical signal transmitted from the paired optical space communications transmission and reception terminal 1A having the same configuration and propagating in the space is incident on the tracking mirror 6, the tracking mirror 6 outputs the incident optical signal toward the fiber coupling unit 5. For example, the tracking mirror 6 includes at least a mirror unit that reflects incident light toward the fiber coupling unit 5 and a mirror drive unit that changes an angle of the mirror unit.

When a propagation angle error (7) of the optical signal is input from the angle sensor 8, the tracking mirror 6 outputs an optical signal in which the propagation angle is corrected on the basis of the input propagation angle error (7). The propagation angle error (7) is a difference in propagation angle from the light beam coinciding with the optical axis. For example, the mirror drive unit changes the angle of the mirror unit so as to eliminate the propagation angle error (7), thereby correcting the propagation angle of the optical signal incident on the tracking mirror 6. The optical signal whose propagation angle has been corrected is output to the side of the fiber coupling unit 5 via the beam splitter 7.

When the transmission optical signal made into collimated light by the fiber coupling unit 5 is incident on the tracking mirror 6 via the beam splitter 7, the tracking mirror 6 outputs the incident collimated light to space. As a result, the transmission optical signal is transmitted to the paired optical space communications transmission and reception terminal 1A. In addition, the tracking mirror 6 corrects the propagation angle of the transmission optical signal (6) collimated by the fiber coupling unit 5 on the basis of the propagation angle error (7) detected by the angle sensor 8, and outputs the optical signal with the corrected propagation angle to space. As a result, the propagation direction of the optical signal transmitted to the paired optical space communications transmission and reception terminal 1A is compensated.

The beam splitter 7 distributes a part of the optical signal propagating between the fiber coupling unit 5 and the tracking mirror 6 to the angle sensor 8. For example, the beam splitter 7 distributes a part of the transmission optical signal output from the fiber coupling unit 5 to the tracking mirror 6 to the angle sensor 8, and distributes a part of the transmission optical signal output from the tracking mirror 6 to the fiber coupling unit 5 to the angle sensor 8.

The angle sensor 8 detects a propagation angle error (7) of the optical signal distributed by the beam splitter 7, and outputs the detected propagation angle error (7) to the tracking mirror 6. Further, the angle sensor 8 extracts a clock signal from the optical signal distributed by the beam splitter 7, and outputs the extracted clock signal to the optical transceiver 2 as a reception clock signal (8). The reception clock signal (8) is a sine wave signal of a clock frequency or a signal configured by repetition of a 0 (low) value and a 1 (high) value, and only the frequency is used as a clock.

Figure 4:
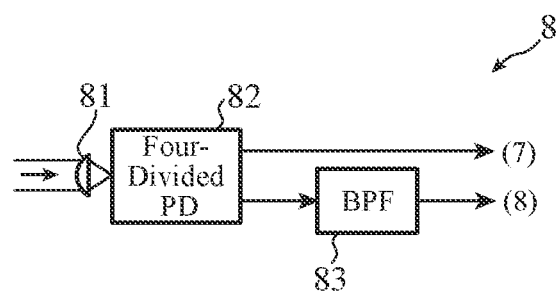
FIG. 4 is a block diagram illustrating a configuration of an example (1) of an angle sensor.

The angle sensor 8 has, for example, a configuration illustrated in FIG. 4. FIG. 4 is a block diagram illustrating a configuration of an example (1) of the angle sensor 8. In FIG. 4, the angle sensor 8 includes a lens 81, a four-divided light receiving element 82 (Hereinafter, it is referred to as a four-divided PD 82), and a bandpass filter 83 (Hereinafter, it is referred to as a BPF 83).

The lens 81 condenses the optical signal distributed by the beam splitter 7 at the center of the light receiving surface of the four-divided PD 82. The four-divided PD 82 is a split type light receiving element having a light receiving surface divided into four light receiving areas. The BPF 83 is a bandpass filter having a frequency band of the transmission clock signal (5) in the paired optical space communications transmission and reception terminal 1A as a pass band.

The center of the light receiving surface of the four-divided PD 82 is a position adjacent to all of the four light receiving areas. The four-divided PD 82 includes, for example, a calculation unit to calculate a propagation angle error (7) of the optical signal condensed on the light receiving surface on the basis of the intensity of the light received in the four light receiving areas. When the condensing position of the optical signal deviates from the center of the light receiving surface, there is a difference in intensity of received light between the light receiving areas. The calculation unit of the four-divided PD 82 calculates the deviation of the condensing position from the center of the light receiving surface on the basis of the difference in the intensity of the light received at each of the four light receiving areas and the total intensity of the light received at the four light receiving areas. Further, the calculation unit detects a propagation angle error (7) of the optical signal condensed on the light receiving surface on the basis of the deviation of the condensing position from the center of the light receiving surface.

In the optical space communications system 1, an optical signal transmitted from the optical space communications transmission and reception terminal 1A on the transmission side to the optical space communications transmission and reception terminal 1A on the reception side is an optical signal whose intensity fluctuates in synchronization with the transmission clock signal (5). That is, the fluctuation in the total intensity of the light received at the four light receiving areas on the light receiving surface of the four-divided PD 82 corresponds to the fluctuation in the intensity of the optical signal transmitted from the optical space communications transmission and reception terminal 1A on the transmission side.

The BPF 83 can extract the clock signal by passing the frequency band of the transmission clock signal (5) in the optical space communications transmission and reception terminal 1A on the transmission side in a frequency band of the intensity fluctuation output from the four-divided PD 82. The clock signal extracted by the BPF 83 is output to the optical transceiver 2 as the reception clock signal (8).

Figure 5:
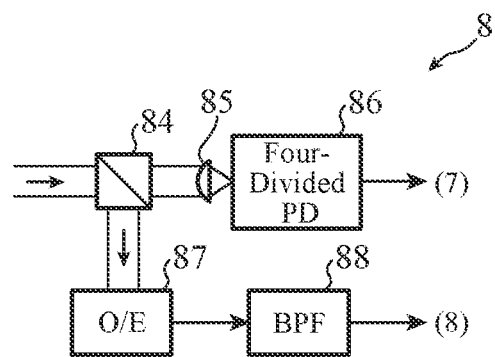
FIG. 5 is a block diagram illustrating a configuration of an example (2) of the angle sensor.

FIG. 5 is a block diagram illustrating a configuration of an example (2) of the angle sensor 8. In FIG. 5, the angle sensor 8 includes a beam splitter 84, a lens 85, a four-divided light receiving element 86 (Hereinafter, it is referred to as a four-divided PD 86), a photoelectric converter 87, and a bandpass filter 88 (Hereinafter, it is referred to as a BPF 88). The photoelectric converter 87 is an "O/E" in FIG. 5. The beam splitter 84 distributes the optical signal divided by the beam splitter 7 into a four-divided PD 86 and a photoelectric converter 87. The lens 85 condenses the optical signal divided by the beam splitter 7 at the center of the light receiving surface of the four-divided PD 86.

Similarly to the four-divided PD 82, the four-divided PD 86 is a light receiving element having a light receiving surface divided into four light receiving areas. The center of the light receiving surface is a position adjacent to all of the four light receiving areas. The four-divided PD 86 includes a calculation unit that calculates a propagation angle error (7) of the optical signal condensed on the light receiving surface on the basis of the intensity of the light received in the four light receiving areas.

When the condensing position of the optical signal deviates from the center of the light receiving surface, there is a difference in intensity of received light between the light receiving areas. The calculation unit of the four-divided PD 86 calculates the deviation of the condensing position from the center of the light receiving surface on the basis of the difference in the intensity of the light received by each of the four light receiving areas and the total intensity of the light received by the four light receiving areas. Further, the calculation unit detects a propagation angle error (7) of the optical signal condensed on the light receiving surface on the basis of the deviation of the condensing position from the center of the light receiving surface.

The photoelectric converter 87 converts the optical signal divided by the beam splitter 7 into an electrical signal. The BPF 88 is a bandpass filter having a frequency band of the transmission clock signal (5) in the paired optical space communications transmission and reception terminal 1A as a pass band.

For example, a single mode fiber is used for the optical space communications transmission and reception terminal 1A. The single mode fiber is generally an optical fiber having a low influence of mode dispersion, and has a restricted core diameter. On the other hand, the four-divided PD 82, the four-divided PD 86, and the photoelectric converter 87 illustrated in FIGS. 4 and 5 have a light receiving area larger than the core diameter of the optical fiber without restriction on the light receiving surface. As a result, even if the wavefront of the input light is distorted, the angle sensor 8 suppresses a decrease in the intensity of the detected optical signal as compared with the intensity of the optical signal when coupled to the optical fiber. That is, since the angle sensor 8 can detect the intensity fluctuation from the optical signal before being coupled to the optical fiber, even in a case where the wavefront of the light is distorted due to the influence of atmospheric fluctuations, the clock signal can be stably extracted from the received optical signal, and can be continuously supplied to the optical transceiver 2.

The clock signal extracted from the received optical signal by the angle sensor 8 is a clock signal synchronized with the symbol rate of the transmission optical signal from the paired optical space communications transmission and reception terminal 1A having the same configuration. Therefore, the optical transceiver 2 can perform sampling in synchronization with the received optical signal by sampling the received optical signal in synchronization with the clock signal extracted by the angle sensor 8. When the SNR of the received optical signal (4) decreases to an uncommunicable state under the influence of atmospheric fluctuations and then recovers to a communicable state, the optical transceiver 2 can immediately demodulate and decode the signal using the clock signal extracted by the angle sensor 8. As a result, it is possible to shorten the time to recovery of communication and to prevent a decrease in communication capacity.

The optical signal transmitted from the optical space communications transmission and reception terminal 1A on the transmission side to the optical space communications transmission and reception terminal 1A on the reception side is an intensity-modulated optical signal whose intensity fluctuates in synchronization with the transmission clock signal (5). That is, the intensity fluctuation of the electrical signal converted from the optical signal by the photoelectric converter 87 corresponds to the fluctuation in the intensity of the transmission optical signal transmitted from the optical space communications transmission and reception terminal 1A on the transmission side.

The BPF 88 can extract the clock signal by passing the frequency band of the transmission clock signal (5) in the optical space communications transmission and reception terminal 1A on the transmission side in the frequency band of the intensity fluctuation of the electrical signal output from the photoelectric converter 87. The clock signal extracted by the BPF 88 is output to the optical transceiver 2 as the reception clock signal (8).

The optical fiber amplifier 9 is connected to the optical fiber held by the fiber coupling unit 5. The optical fiber amplifier 9 is an optical element that amplifies the intensity of the optical signal coupled to the optical fiber by the fiber coupling unit 5 to improve the light receiving sensitivity. The intensity of the beam of the reception light incident on the optical fiber is amplified according to the excitation light, and the received optical signal (4) with the amplified intensity is emitted to the optical transceiver 2.

A specific operation of the optical space communications transmission and reception terminal 1A is as follows.

The optical transceiver 2 modulates transmission data (1) input from the outside at a symbol rate synchronized with a transmission clock signal (5) supplied from the transmission clock source 3, and outputs the modulated transmission optical signal (3) to the intensity modulation unit 4.

The intensity modulation unit 4 superimposes the transmission clock signal (5) supplied from the transmission clock source 3 on the transmission optical signal (3) to generate an intensity-modulated transmission optical signal (3), and outputs the intensity-modulated transmission optical signal (6) to the fiber coupling unit 5. Note that there is a possibility that crosstalk to the reception clock signal (8) occurs due to the intensity fluctuation of the optical signal generated when the optical transceiver 2 modulates the optical signal. Therefore, by setting the frequency of the transmission clock signal (5) superimposed on the transmission optical signal (3) to, for example, a frequency equal to or less than $\frac{1}{10}$ times the symbol rate, the BPF 83 or 88 illustrated in FIGS. 4 and 5 can suppress crosstalk to the reception clock signal (8).

The fiber coupling unit 5 collimates the transmission optical signal (6) intensity-modulated by the intensity modulation unit 4 and outputs the collimated light of the transmission optical signal (6) to the beam splitter 7. The beam splitter 7 outputs the collimated light of the transmission optical signal (6) output from the fiber coupling unit 5 to the tracking mirror 6, and distributes a part of the transmission optical signal (6) to the angle sensor 8. The angle sensor 8 detects a propagation angle error (7) of the optical signal distributed by the beam splitter 7, and outputs the detected propagation angle error (7) to the tracking mirror 6.

The tracking mirror 6 corrects the propagation angle of the transmission optical signal (6) collimated by the fiber coupling unit 5 on the basis of the propagation angle error (7) detected by the angle sensor 8. An optical signal whose propagation angle has been corrected is output to space. As a result, the propagation direction of the optical signal transmitted to the paired optical space communications transmission and reception terminal 1A is compensated.

When the optical signal transmitted from the paired optical space communications transmission and reception terminal 1A and propagating in the space is incident on the tracking mirror 6, the tracking mirror 6 outputs the incident optical signal to the fiber coupling unit 5 via the beam splitter 7. The beam splitter 7 outputs the optical signal output from the tracking mirror 6 to the fiber coupling unit 5, and distributes a part of the optical signal to the angle sensor 8.

The light output from the fiber coupling unit 5 to the tracking mirror 6 and the light output from the tracking mirror 6 to the fiber coupling unit 5 are arranged on the same optical axis. The fiber coupling unit 5 includes a wavelength filter that separates the input light for each wavelength. The fiber coupling unit 5 separates the light in the two directions using a wavelength filter and couples the light to the optical fiber. As a result, even when optical signals having different wavelengths are transmitted between the paired optical space communications transmission and reception terminal 1A, transmission and reception light can be separated in the fiber coupling unit 5. In addition, the fiber coupling unit 5 may be provided with an optical circulator that separates light in two directions.

The light output from the fiber coupling unit 5 to the tracking mirror 6 and the light output from the tracking mirror 6 to the fiber coupling unit 5 are made parallel to each other. The angle sensor 8 detects a propagation angle error (7) of the light output from the tracking mirror 6 to the fiber coupling unit 5 among the light in the two directions. The tracking mirror 6 may correct the propagation angles of both the light output from the fiber coupling unit 5 to the tracking mirror 6 and the light output from the tracking mirror 6 to the fiber coupling unit 5 using the propagation angle error (7) detected from the light output from the tracking mirror 6 to the fiber coupling unit 5.

The fiber coupling unit 5 couples the optical signal output from the tracking mirror 6 to the optical fiber. The optical fiber amplifier 9 amplifies the intensity of the received optical signal (4) coupled to the optical fiber by the fiber coupling unit 5, and outputs the received optical signal (4) with the amplified intensity to the optical transceiver 2 through the optical fiber. The angle sensor 8 extracts a reception clock signal (8) from a part of the optical signal distributed by the beam splitter 7, and outputs the extracted reception clock signal (8) to the optical transceiver 2.

The optical transceiver 2 samples the received optical signal (4) propagated through the optical fiber at a cycle synchronized with the reception clock signal (8), demodulates and decodes the sampled signal to generate received data (2), and outputs the received data (2) to the outside of the device.

Note that, when the optical multiplexer 42 illustrated in FIG. 3 wavelength-multiplexes the transmission clock signal (5) having a wavelength different from that of the transmission optical signal (3) as a modulation signal, the optical transceiver 2 coherently detects the received optical signal (4) (the transmission optical signal (6) transmitted from the paired optical space communication transmission and reception terminal 1A). As a result, the optical transceiver 2 can demodulate and decode a transmission optical signal having a wavelength different from that of the transmission clock signal from the received optical signal (4) (intensity-modulated transmission optical signal (6)).

Note that, although FIGS. 4 and 5 illustrate the configuration in which the four-divided PD 82 or the four-divided PD 86 detects the propagation angle error of the optical signal, the light receiving element included in the angle sensor 8 is not limited to the four-divided light receiving element as long as the light receiving element has a light receiving surface divided into a plurality of pieces. For example, any light receiving element may be used as long as the light receiving element can detect the deviation between the center position of the light receiving surface and the condensing position of the optical signal, and the light receiving surface may be divided into two, or the light receiving surface may be divided into five or more.

As described above, in the optical space communications transmission and reception terminal 1A according to the first embodiment, the angle sensor 8 extracts the clock signal from the optical signal before being coupled to the optical fiber. As a result, the optical space communications transmission and reception terminal 1A can extract the clock signal without waiting for recovery of the SNR of the received optical signal when communication is disabled due to a decrease in the SNR of the received optical signal caused by a loss generated when the optical signal is coupled to the optical fiber. As a result, the time until the communication is recovered can be shortened as compared with a case where the clock signal is extracted after the recovery of the SNR of the received optical signal.

In the optical space communications transmission and reception terminal 1A according to the first embodiment, the angle sensor 8 includes the four-divided PD 82 or 86 to receive an optical signal on a light receiving surface divided into four, the lens 81 or 85 to condense an optical signal at a center position of the light receiving surface of the four-divided PD 82 or 86, and the BPF 83 or 88 to use a frequency band of the transmission clock signal (5) from the paired optical space communications transmission and reception terminal 1A having the same configuration as a pass band. The angle sensor 8 detects a propagation angle error of the optical signal on the basis of a deviation between the condensing position of the optical signal and the center position of the four-divided PD 82 or 86. The clock signal extracted by the BPF 83 or 88 is output to the optical transceiver 2 as a reception clock signal. For example, since the four-divided PD 82 or 86 has a light receiving area larger than the core diameter of the optical fiber, the angle sensor 8 can detect the intensity fluctuation from the optical signal before being coupled to the optical fiber. As a result, even when the optical signal is affected by atmospheric fluctuations, the angle sensor 8 can stably extract the clock signal from the received optical signal and continue to supply the clock signal to the optical transceiver 2.

The optical space communications system 1 according to the first embodiment includes a pair of optical space communications transmission and reception terminals 1A having the same configuration, and bidirectional communication is performed between the pair of optical space communications transmission and reception terminals 1A having the same configuration. As a result, when communication is disabled due to a decrease in the SNR of the received optical signal caused by a loss generated when the optical signal is coupled to the optical fiber, it is possible to extract the clock signal without waiting for recovery of the SNR of the received optical signal. As a result, the time until the communication is recovered can be shortened as compared with a case where the clock signal is extracted after the recovery of the SNR of the received optical signal.

Second Embodiment

Figure 6:
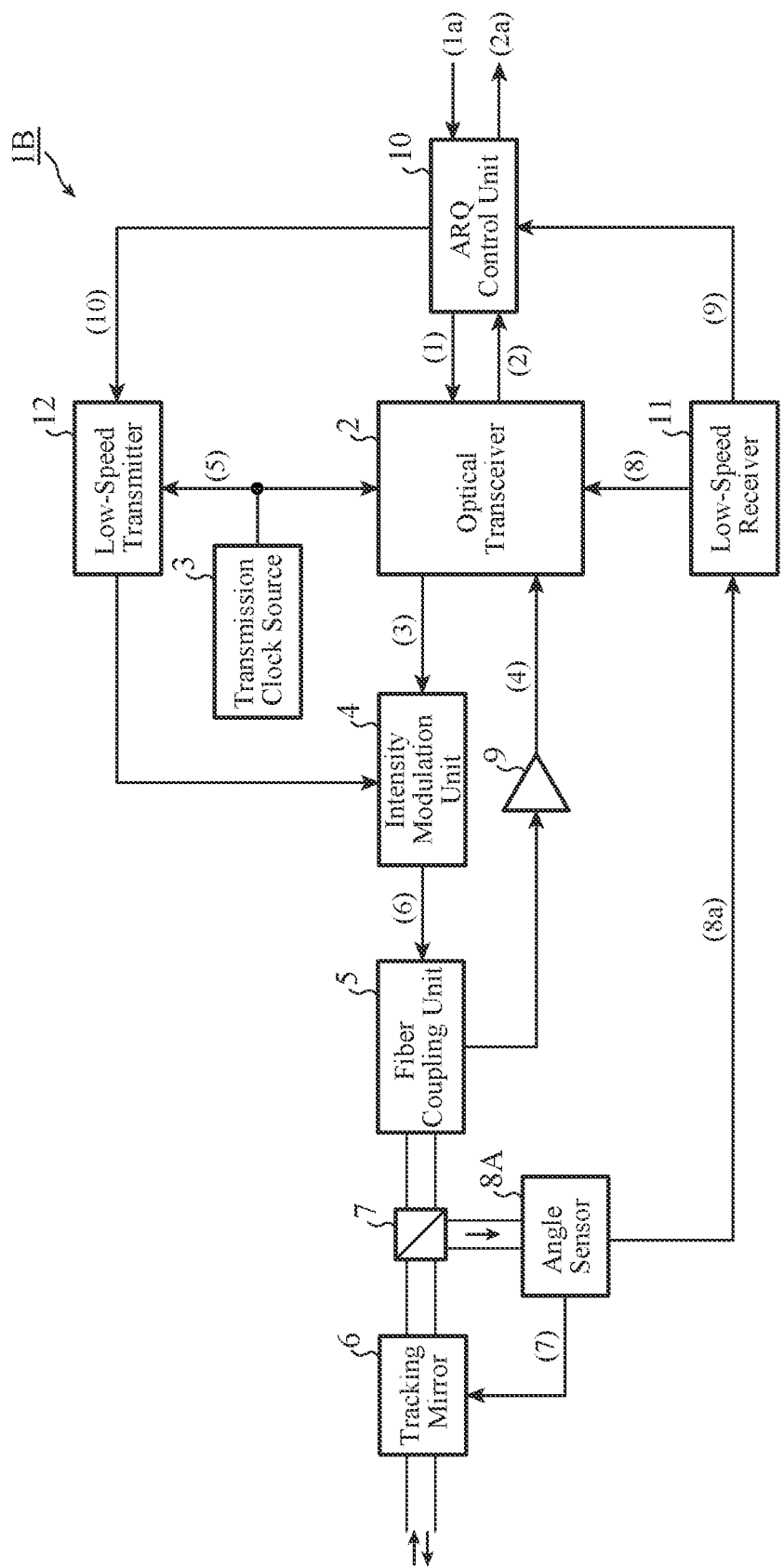
FIG. 6 is a block diagram illustrating a configuration of an optical space communications transmission and reception terminal according to a second embodiment.

FIG. 6 is a block diagram illustrating a configuration of an optical space communications transmission and reception terminal 1B according to a second embodiment. In FIG. 6, the same components as those in FIG. 2 are denoted by the same reference numerals, and description thereof is omitted. In the optical space communications system 1 illustrated in FIG. 1, the optical space communications transmission and reception terminal 1B performs bidirectional communication with a paired optical space communications transmission and reception terminal 1B having the same configuration.

As illustrated in FIG. 6, the optical space communications transmission and reception terminal 1B includes an optical transceiver 2, a transmission clock source 3, an intensity modulation unit 4, a fiber coupling unit 5, a tracking mirror 6, a beam splitter 7, an angle sensor 8A, an optical fiber amplifier 9, an automatic repeat request (ARQ) control unit 10, a low-speed receiver 11, and a low-speed transmitter 12.

In the optical space communications transmission and reception terminal 1, the optical transceiver 2, the intensity modulation unit 4, the fiber coupling unit 5, and the optical fiber amplifier 9 are connected to each other by an optical fiber. In addition, the optical transceiver 2, the transmission clock source 3, the tracking mirror 6, the angle sensor 8A, the ARQ control unit 10, the low-speed receiver 11, and the low-speed transmitter 12 are connected to each other by signal lines.

The angle sensor 8A receives the optical signal distributed by the beam splitter 7 and generates an intensity-modulated signal (8a) of the received optical signal. The intensity-modulated signal (8a) is an electrical signal indicating an intensity fluctuation of the optical signal. For example, the intensity-modulated signal (8a) is a digital signal configured by an arrangement of a 0 (low) value and a 1 (high) value, and is a signal including a frame retransmission request or the like. The intensity-modulated signal (8a) includes a sine wave component such as the reception clock signal (8), and the low-speed receiver 11 can extract the sine wave component from the intensity-modulated signal (8a). In addition, similarly to the angle sensor 8, the angle sensor 8A has, for example, the components illustrated in FIGS. 4 and 5. The four-divided PD 82 or 86 detects a propagation angle error of the incident light and detects an intensity fluctuation of the incident light. In addition, the BPF 83 or 88 is a bandpass filter using a frequency band of a signal output from the low-speed transmitter 12 included in the paired optical space communications transmission and reception terminal 1B as a pass band.

Among the signals indicating the intensity fluctuation detected by the four-divided PD 82 or 86, the signal that has passed through the BPF 83 or 88 is output as an intensity-modulated signal (8a). The intensity-modulated signal (8a) output from the angle sensor 8A is output to the low-speed receiver 11. The low-speed receiver 11 demodulates and decodes the intensity-modulated signal (8a) to reproduce a clock signal synchronized with the symbol rate. The clock signal reproduced by the low-speed receiver 11 is output to the optical transceiver 2.

The ARQ control unit 10 outputs the transmission frame (1a) input from the outside of the device to the optical transceiver 2 as transmission data (1). In addition, the ARQ control unit 10 outputs a transmission frame corresponding to a sequence number indicated by a retransmission request signal (9) output from the low-speed receiver 11 to the optical transceiver 2 as transmission data. Further, the ARQ control unit 10 stores the received data (2) output from the optical transceiver 2 as a received frame (2a), and outputs a retransmission request signal (10) of a received frame (2a) corresponding to a missing sequence number to the low-speed transmitter 12 in a case where the sequence number of the received frame (2a) is missing.

The low-speed receiver 11 demodulates and decodes the intensity-modulated signal (8a) output from the angle sensor 8A to reproduce a clock signal synchronized with the symbol rate, and outputs the reproduced clock signal to the optical transceiver 2 as the reception clock signal (8). Further, when demodulating and decoding the intensity-modulated signal (8a) to reproduce the retransmission request signal (9), the low-speed receiver 11 outputs the reproduced retransmission request signal (9) to the ARQ control unit 10. The retransmission request signal (9) is a signal indicating a retransmission request of a missing communication frame, and includes a sequence number corresponding to the frame. Note that, the sequence number is stored in a header or the like of the communication frame.

The low-speed transmitter 12 converts the retransmission request signal (10) output from the ARQ control unit 10 into a signal modulated at a symbol rate synchronized with the transmission clock signal (5), and outputs the converted signal to the intensity modulation unit 4. The symbol rate is the same as or similar to the frequency of the transmission clock signal (5). Even when there is no retransmission request signal (10) from the ARQ control unit 10, the low-speed transmitter 12 continuously outputs a random signal modulated at a symbol rate synchronized with the transmission clock signal (5) to the intensity modulation unit 4. In the intensity modulation processing of the intensity modulation unit 4, the intensity modulation unit 4 prevents the modulation amplitude from being small and the intensity of the transmission optical signal (3) from greatly fluctuating. As a result, it is possible to reduce the influence of the fluctuation in the intensity of the intensity-modulated transmission optical signal (3) on the modulation and demodulation processing of the optical signal performed by the optical transceiver 2. By using a modulation speed lower than the modulation speed of the optical transceiver (2), it is possible to perform demodulation by the low-speed receiver even if the intensity fluctuation is reduced.

Figure 7:
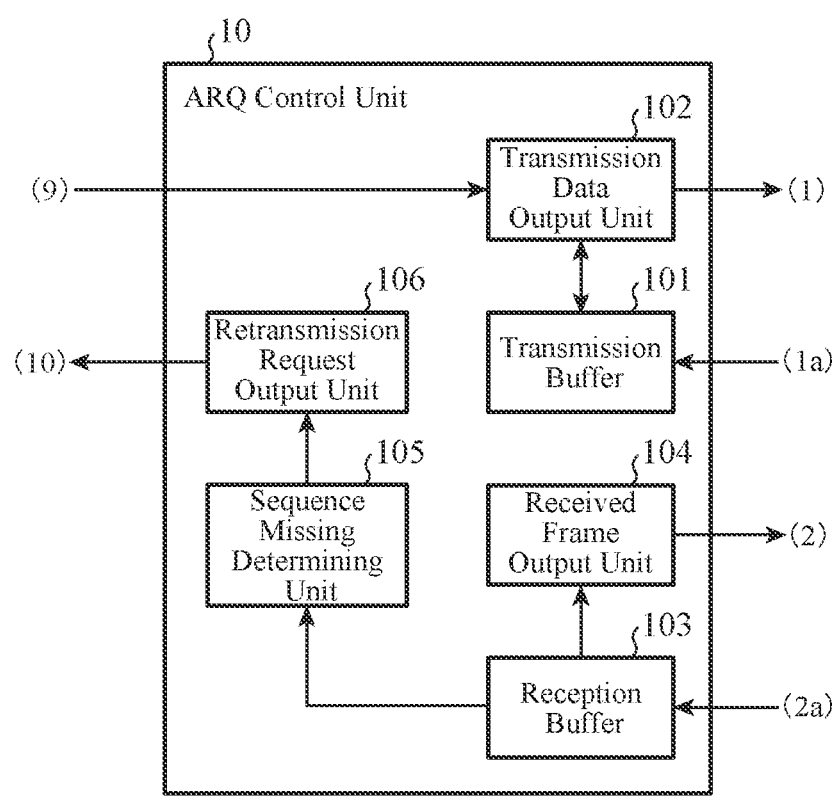
FIG. 7 is a block diagram illustrating a configuration of an ARQ control unit.

FIG. 7 is a block diagram illustrating a configuration of the ARQ control unit 10. In FIG. 7, the ARQ control unit 10 includes a transmission buffer 101, a transmission data output unit 102, a reception buffer 103, a received frame output unit 104, a sequence missing determining unit 105, and a retransmission request output unit 106. The transmission buffer 101 is an internal buffer that stores transmission frames (1a) input from the outside in order of sequence numbers. The transmission data output unit 102 outputs the transmission frame (1a) read from the transmission buffer 101 in the order of sequence numbers to the optical transceiver 2 as transmission data (1).

The reception buffer 103 is an internal buffer that stores the received data (2) output from the optical transceiver 2 as a received frame (2a) in the order of sequence numbers. The received frame output unit 104 outputs the received frames (2a) stored in the reception buffer 103 to the outside of the device in the order of sequence numbers.

The sequence missing determining unit 105 is a determination unit that determines whether or not missing has occurred in the sequence number of the received frame (2a)

stored in the reception buffer 103. When the sequence missing determining unit 105 determines that missing has occurred in the sequence number, the retransmission request output unit 106 outputs a retransmission request signal (10) of the received frame (2*a*) corresponding to the missing sequence number to the low-speed transmitter 12.

A specific operation of the optical space communications transmission and reception terminal 1B is as follows.

The ARQ control unit 10 outputs the transmission frame (1*a*) input from the outside of the device to the optical transceiver 2 as transmission data (1). The optical transceiver 2 modulates the transmission data (1) input from the ARQ control unit 10 at a symbol rate synchronized with the transmission clock signal (5) supplied from the transmission clock source 3, and outputs the modulated transmission optical signal (3) to the intensity modulation unit 4.

The low-speed transmitter 12 outputs a signal modulated at a symbol rate synchronized with the transmission clock signal (5) to the intensity modulation unit 4. When there is a retransmission request signal (10) from the ARQ control unit 10, the low-speed transmitter 12 outputs, to the intensity modulation unit 4, a signal obtained by modulating the retransmission request signal (10) at a symbol rate synchronized with the transmission clock signal (5).

The intensity modulation unit 4 superimposes the signal output from the low-speed transmitter 12 on the transmission optical signal (3) to generate an intensity-modulated transmission optical signal (6), and outputs the intensity-modulated transmission optical signal (6) to the fiber coupling unit 5. Note that there is a possibility that crosstalk to the intensity-modulated signal (8*a*) occurs due to intensity fluctuation of the optical signal generated when the optical transceiver 2 modulates the optical signal. Therefore, by setting the frequency of the intensity-modulated signal (8*a*) superimposed on the transmission optical signal (3) to, for example, a frequency equal to or less than 1/10 times the symbol rate, the BPF 83 or 88 illustrated in FIGS. 4 and 5 can suppress crosstalk to the intensity-modulated signal (8*a*).

The fiber coupling unit 5 collimates the transmission optical signal (6) intensity-modulated by the intensity modulation unit 4 and outputs the collimated light of the transmission optical signal (6) to the beam splitter 7. The beam splitter 7 outputs collimated light of the transmission optical signal (6) output from the fiber coupling unit 5 to the tracking mirror 6, and distributes a part of the transmission optical signal (6) to the angle sensor 8A. The angle sensor 8A detects a propagation angle error (7) of the optical signal distributed by the beam splitter 7, and outputs the detected propagation angle error (7) to the tracking mirror 6.

The tracking mirror 6 corrects the propagation angle of the transmission optical signal (6) collimated by the fiber coupling unit 5 on the basis of the propagation angle error (7) detected by the angle sensor 8A. An optical signal whose propagation angle has been corrected is output to space. As a result, the propagation direction of the optical signal transmitted to the paired optical space communications transmission and reception terminal 1B is compensated.

When the optical signal transmitted from the paired optical space communications transmission and reception terminal 1B and propagating in the space is incident on the tracking mirror 6, the tracking mirror 6 outputs the incident optical signal to the side of the fiber coupling unit 5 via the beam splitter 7. The beam splitter 7 outputs the optical signal output from the tracking mirror 6 to the fiber coupling unit 5, and distributes a part of the optical signal to the angle sensor 8A.

The light output from the fiber coupling unit 5 to the tracking mirror 6 and the light output from the tracking mirror 6 to the fiber coupling unit 5 are arranged on the same optical axis. The fiber coupling unit 5 includes a wavelength filter that separates the input light for each wavelength. The fiber coupling unit 5 separates the light in the two directions using a wavelength filter and couples the light to the optical fiber. As a result, even when optical signals having different wavelengths are transmitted between the pair of optical space communications transmission and reception terminals 1, transmission and reception light can be separated in the fiber coupling unit 5. In addition, the fiber coupling unit 5 may be provided with an optical circulator that separates light in two directions.

The light output from the fiber coupling unit 5 to the tracking mirror 6 and the light output from the tracking mirror 6 to the fiber coupling unit 5 are made parallel to each other. The angle sensor 8A detects a propagation angle error (7) of the light output from the tracking mirror 6 to the fiber coupling unit 5 among the light in two directions. The tracking mirror 6 may correct the propagation angles of both the light output from the fiber coupling unit 5 to the tracking mirror 6 and the light output from the tracking mirror 6 to the fiber coupling unit 5 using the propagation angle error (7) detected from the light output from the tracking mirror 6 to the fiber coupling unit 5.

The fiber coupling unit 5 couples the optical signal output from the tracking mirror 6 to the optical fiber. The optical fiber amplifier 9 amplifies the intensity of the received optical signal (4) coupled to the optical fiber by the fiber coupling unit 5, and outputs the received optical signal (4) with the amplified intensity to the optical transceiver 2 through the optical fiber. The angle sensor 8A generates an intensity-modulated signal (8*a*) from a part of the optical signal distributed by the beam splitter 7, and outputs the intensity-modulated signal (8*a*) to the low-speed receiver 11.

The low-speed receiver 11 demodulates and decodes the intensity-modulated signal (8*a*) output from the angle sensor 8A to reproduce a reception clock signal (8) synchronized with the symbol rate. The reception clock signal (8) reproduced by the low-speed receiver 11 is output to the optical transceiver 2. The optical transceiver 2 samples the received optical signal (4) propagated through the optical fiber at a cycle synchronized with the reception clock signal (8). The optical transceiver 2 demodulates and decodes the sampled signal to generate received data (2), and outputs the generated received data (2) to the ARQ control unit 10.

The ARQ control unit 10 stores the received data (2) output from the optical transceiver 2 as a received frame (2*a*), and in a case where a sequence number is missing in the stored received frame (2*a*), outputs a retransmission request signal (10) of the received frame (2*a*) corresponding to the missing sequence number to the low-speed transmitter 12.

Note that, in a case where the optical multiplexer 42 illustrated in FIG. 3 wavelength-multiplexes a signal having a wavelength different from that of the transmission optical signal (3) as a modulation signal, the optical transceiver 2 coherently detects the received optical signal (4) (the transmission optical signal (6) transmitted from the paired optical space communications transmission and reception terminal 1). As a result, the optical transceiver 2 can demodulate and decode a transmission optical signal having a wavelength different from that of the transmission clock signal from the received optical signal (4) (intensity-modulated transmission optical signal (6)).

Figure 8:
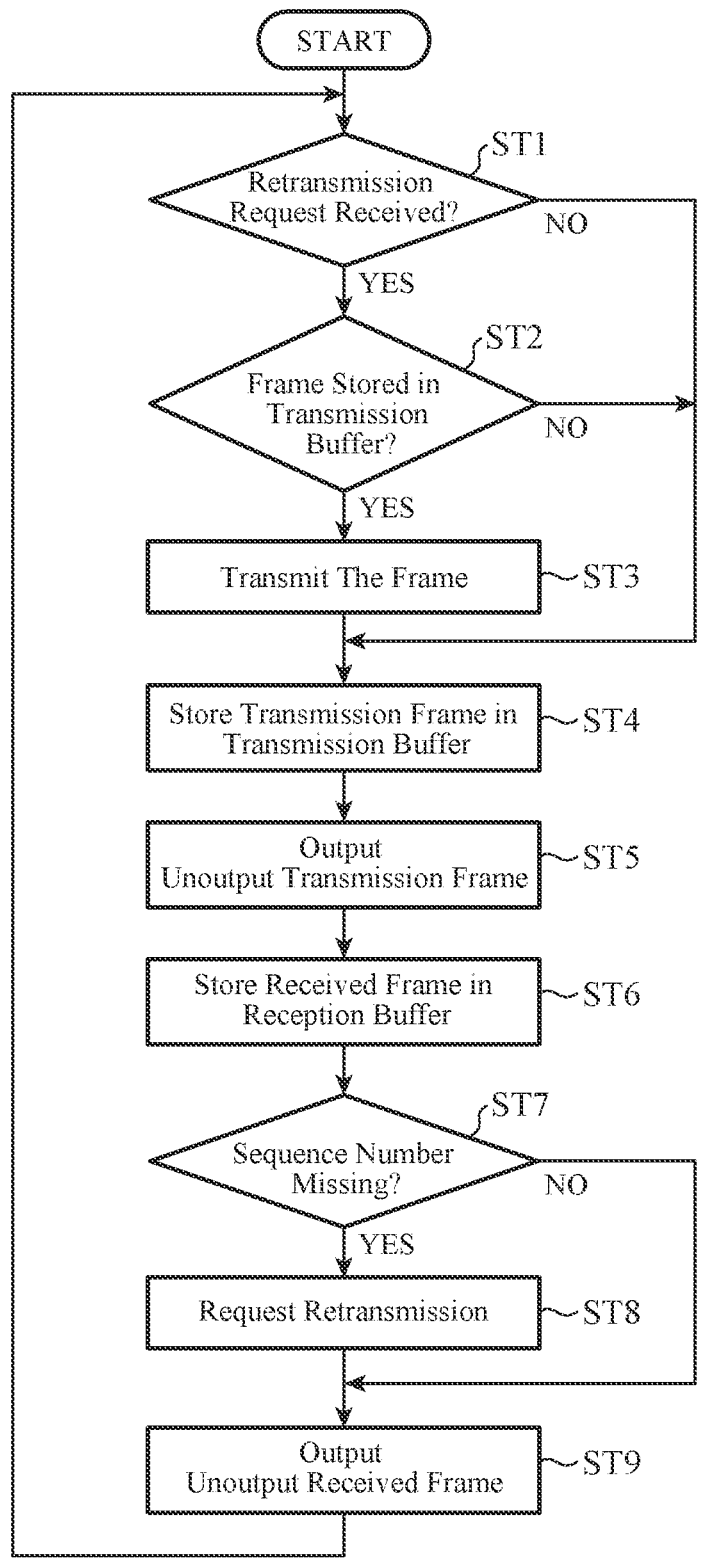
FIG. 8 is a flowchart illustrating an operation of the ARQ control unit.

FIG. 8 is a flowchart illustrating the operation of the ARQ control unit 10.

The transmission data output unit 102 checks whether or not a retransmission request signal (9) is received from the low-speed receiver 11 (step ST1). When the retransmission request signal (9) is not received (step ST1; NO), the process proceeds to step ST4. Further, when the retransmission request signal of the communication frame corresponding to the specific sequence number is received (step ST1; YES), the transmission data output unit 102 checks whether or not the transmission frame (1*a*) is stored in the transmission buffer 101 (step ST2). When the transmission frame (1*a*) is not stored in the transmission buffer 101 (step ST2; NO), the process proceeds to step ST4.

In a case where the transmission frame (1*a*) is stored in the transmission buffer 101 (step ST2; YES), the transmission data output unit 102 outputs the transmission frame (1*a*) stored in the transmission buffer 101 to the optical transceiver 2 as transmission data (1) (step ST3). The transmission buffer 101 stores the transmission frames (1*a*) input from the outside in order of sequence numbers (step ST4). If there is an unoutput frame among the transmission frames stored in the transmission buffer 101, the transmission data output unit 102 outputs the frame to the optical transceiver 2 (step ST5).

The reception buffer 103 stores the received data (2) output from the optical transceiver 2 as the received frame (2*a*) in the order of sequence numbers (step ST6). Next, the sequence missing determining unit 105 determines whether or not the sequence number is missing in the received frame (2*a*) stored in the reception buffer 103 (step ST7). Here, if the sequence number is missing (step ST7; YES), the retransmission request output unit 106 outputs the retransmission request signal (10) of the communication frame with the missing sequence number to the low-speed transmitter 12 (step ST8).

In addition, if the sequence number is not missing (step ST7; NO), the received frame output unit 104 reads the unoutput received frame among the received frames stored in the reception buffer 103, and outputs the read received frame (2*a*) to the outside of the device (step ST9). Thereafter, the process returns to step ST1, and a series of processing from step ST1 is repeatedly performed.

The missing of the sequence number occurs when the frame corresponding to the missing sequence number cannot be demodulated and decoded by the optical transceiver 2. For example, the wavefront of light propagating in the space is distorted due to the influence of atmospheric fluctuations, and the intensity decreases (loss) when an optical signal in which the wavefront is distorted is coupled to the optical fiber. As a result, the SNR of the received optical signal (4) is lower than the SNR necessary for demodulation, so that the received frame cannot be demodulated and decoded.

The ARQ control unit 10 interpolates missing of the sequence number of the received frame stored in the reception buffer 103, and then outputs the frames in order of sequence numbers. Note that the frames stored in the transmission buffer 101 and the reception buffer 103 are discarded when a predetermined time has elapsed.

Figure 9:
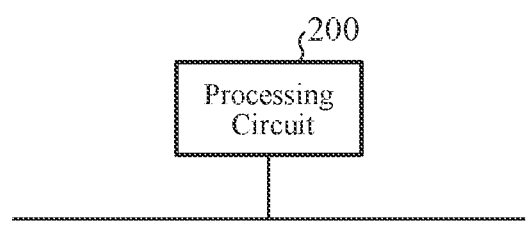
FIG. 9 is a block diagram illustrating a hardware configuration for implementing a function of the ARQ control unit.
Figure 10:
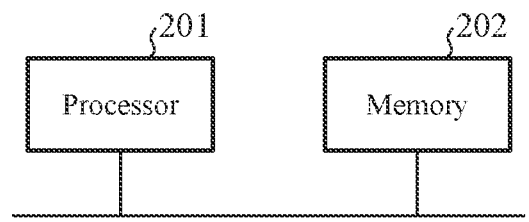
FIG. 10 is a block diagram illustrating a hardware configuration for executing software for implementing the function of the ARQ control unit.

FIG. 9 is a block diagram illustrating a hardware configuration for implementing functions of the ARQ control unit 10. FIG. 10 is a block diagram illustrating a hardware configuration for executing software for implementing the functions of the ARQ control unit 10. The functions of the transmission buffer 101, the transmission data output unit 102, the reception buffer 103, the received frame output unit 104, the sequence missing determining unit 105, and the retransmission request output unit 106 included in the ARQ control unit 10 are implemented by a processing circuit. That is, the ARQ control unit 10 includes a processing circuit that executes the processing from step ST1 to step ST9 illustrated in FIG. 8. The processing circuit may be dedicated hardware or a central processing unit (CPU) that executes a program stored in a memory.

In a case where the processing circuit is a processing circuit 200 of dedicated hardware illustrated in FIG. 9, the processing circuit 200 corresponds to, for example, a single circuit, a composite circuit, a programmed processor, a parallel programmed processor, an application specific integrated circuit (ASIC), a field-programmable gate array (FPGA), or a combination thereof. The functions of the transmission buffer 101, the transmission data output unit 102, the reception buffer 103, the received frame output unit 104, the sequence missing determining unit 105, and the retransmission request output unit 106 included in the ARQ control unit 10 may be implemented by separate processing circuits, or these functions may be collectively implemented by one processing circuit.

In a case where the processing circuit is a processor 201 illustrated in FIG. 10, the functions of the transmission buffer 101, the transmission data output unit 102, the reception buffer 103, the received frame output unit 104, the sequence missing determining unit 105, and the retransmission request output unit 106 included in the ARQ control unit 10 are implemented by software, firmware, or a combination of software and firmware. Note that, software or firmware is written as a program and stored in a memory 202.

The processor 201 reads and executes the program stored in the memory 202, thereby implementing the functions of the transmission buffer 101, the transmission data output unit 102, the reception buffer 103, the received frame output unit 104, the sequence missing determining unit 105, and the retransmission request output unit 106 included in the ARQ control unit 10. For example, the ARQ control unit 10 includes the memory 202 for storing a program that results in execution of the processing of steps ST1 to ST9 in the flowchart illustrated in FIG. 8 when executed by the processor 201. These programs cause a computer to execute procedures or methods performed by the transmission buffer 101, the transmission data output unit 102, the reception buffer 103, the received frame output unit 104, the sequence missing determining unit 105, and the retransmission request output unit 106. The memory 202 may be a computer-readable storage medium storing a program for causing a computer to function as the transmission buffer 101, the transmission data output unit 102, the reception buffer 103, the received frame output unit 104, the sequence missing determining unit 105, and the retransmission request output unit 106.

The memory 202 corresponds to, for example, a nonvolatile or volatile semiconductor memory such as a random access memory (RAM), a read only memory (ROM), a flash memory, an erasable programmable read only memory (EPROM), or an electrically-EPROM (EEPROM: a magnetic disk, a flexible disk, an optical disk, a compact disk, a mini disk, or a DVD.

Apart of the functions of the transmission buffer 101, the transmission data output unit 102, the reception buffer 103, the received frame output unit 104, the sequence missing determining unit 105, and the retransmission request output unit 106 included in the ARQ control unit 10 may be implemented by dedicated hardware, and the remaining part may be implemented by software or firmware. For example, the functions of the transmission buffer 101 and the reception buffer 103 are implemented by the processing circuit 200 that is dedicated hardware, and the functions of the transmission data output unit 102, the received frame output unit 104, the sequence missing determining unit 105, and the retransmission request output unit 106 are implemented by the processor 201 reading and executing a program stored in the memory 202. Thus, the processing circuit can implement the above functions by hardware, software, firmware, or a combination thereof.

As described above, in the optical space communications transmission and reception terminal 1B according to the second embodiment, the angle sensor 8A extracts the intensity-modulated signal from the optical signal before being coupled to the optical fiber. The low-speed receiver 11 demodulates and decodes the intensity-modulated signal output from the angle sensor 8A to reproduce a clock signal synchronized with the symbol rate, and outputs the reproduced clock signal to the optical transceiver 2 as a reception clock signal (8). Even in a case where communication is disabled due to a decrease in the SNR of the received optical signal caused by a loss generated when the optical signal is coupled to the optical fiber, the angle sensor 8A can stably extract the intensity-modulated signal. Therefore, the low-speed receiver 11 can stably demodulate and decode the retransmission request signal as compared with the optical transceiver 2, and can stably supply the reception clock signal to the optical transceiver 2. As a result, as compared with a case where the clock signal is extracted after the recovery of the SNR of the received optical signal, the optical space communications transmission and reception terminal 1B can shorten the time until the communication is recovered, and can prevent a decrease in the communication capacity. In addition, the low-speed receiver 11 can stably demodulate and decode the retransmission request signal of the communication frame and output the signal to the ARQ control unit 10. As a result, it is possible to respond to the retransmission request without delay and suppress the transmission delay.

In the optical space communications transmission and reception terminal 1B according to the second embodiment, the ARQ control unit 10 includes the transmission buffer 101, the transmission data output unit 102, the reception buffer 103, the received frame output unit 104, the sequence missing determining unit 105, and the retransmission request output unit 106. With these components, even if the sequence number of the frame stored in the reception buffer 103 is missing, the ARQ control unit 10 can request retransmission of the corresponding frame without delay.

The optical space communications system 1 according to the second embodiment includes a pair of optical space communications transmission and reception terminals 1B having the same configuration, and bidirectional communication is performed between the pair of optical space communications transmission and reception terminals 1B having the same configuration. As a result, when communication is disabled due to a decrease in the SNR of the received optical signal caused by a loss generated when the optical signal is coupled to the optical fiber, it is possible to extract the clock signal without waiting for recovery of the SNR of the received optical signal. As a result, the time until the communication is recovered can be shortened as compared with a case where the clock signal is extracted after the recovery of the SNR of the received optical signal.

Third Embodiment

Figure 11:
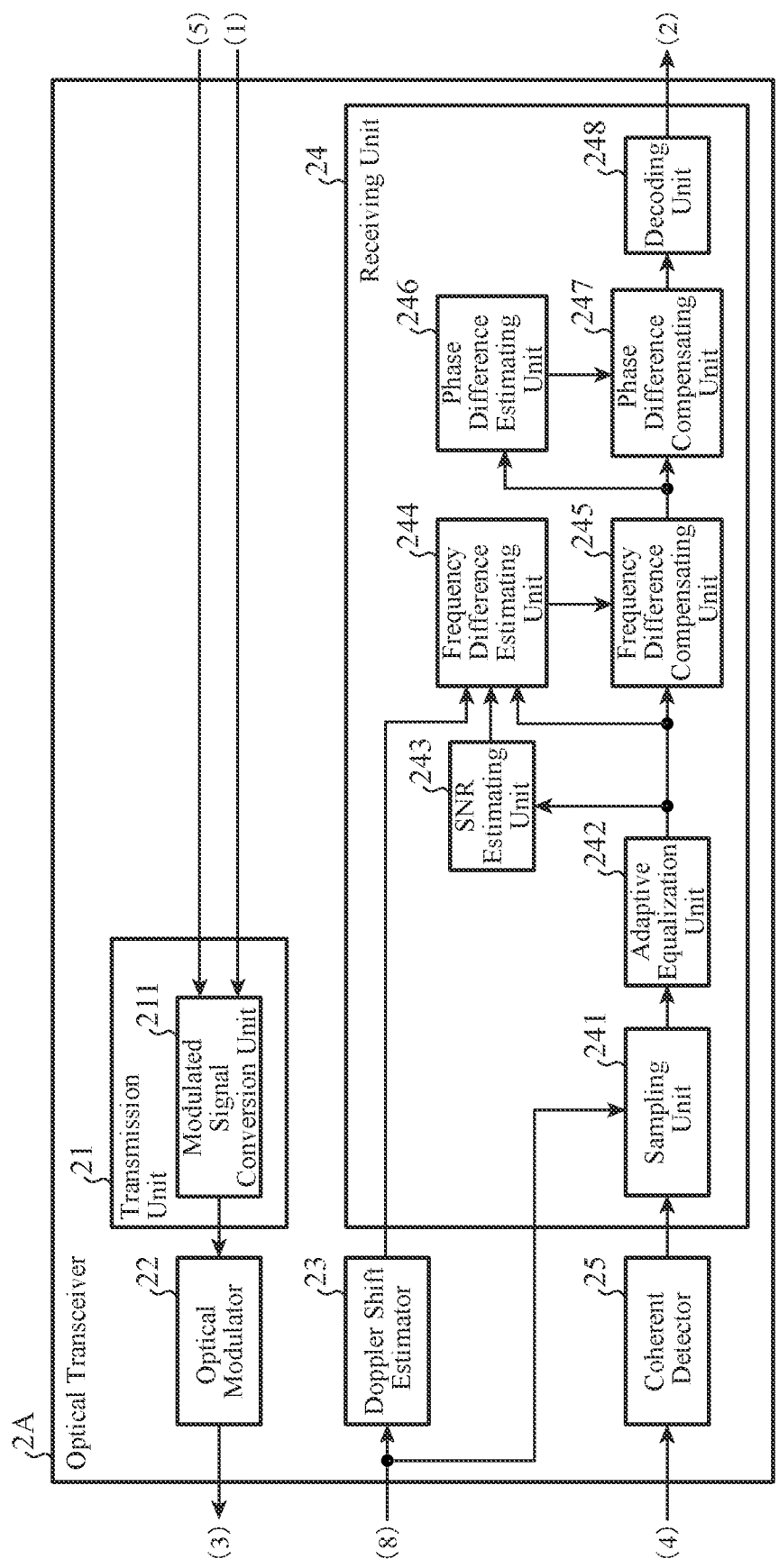
FIG. 11 is a block diagram illustrating a configuration of an optical transceiver included in an optical space communications transmission and reception terminal according to a third embodiment.

FIG. 11 is a block diagram illustrating a configuration of an optical transceiver 2A according to a third embodiment included in an optical space communications transmission and reception terminal 1A or 1B. The optical transceiver 2A is provided instead of the optical transceiver 2 in the optical space communications transmission and reception terminal 1A illustrated in FIG. 1 or the optical space communications transmission and reception terminal 1B illustrated in FIG. 6. As illustrated in FIG. 11, the optical transceiver 2A includes a transmission unit 21, an optical modulator 22, a Doppler shift estimator 23, a receiving unit 24, and a coherent detector 25.

The transmission unit 21 outputs a signal obtained by modulating the transmission data (1) at a symbol rate synchronized with the transmission clock signal (5). The transmission unit 21 includes a modulated signal conversion unit 211. The transmission unit 21 is, for example, a digital signal processor (DSP). The modulated signal conversion unit 211 converts the input transmission data (1) into a signal modulated at a symbol rate synchronized with the transmission clock signal (5).

The optical modulator 22 converts the modulated signal output from the transmission unit 21 into a transmission optical signal (3) and outputs the transmission optical signal (3) to the intensity modulation unit 4. The Doppler shift estimator 23 estimates the Doppler shift amount of the reception clock signal (8) input from the angle sensor 8 or the low-speed receiver 11. The Doppler shift amount is a value obtained by dividing the frequency difference generated by the Doppler shift by the frequency before the shift. For example, the Doppler shift estimator 23 detects a frequency difference between the reception clock signal (8) and an internal clock signal having the same nominal frequency as the reception clock signal (8), and divides the frequency difference by the nominal frequency to calculate the Doppler shift amount. Further, the reception clock signal (8) is also input to the receiving unit 24.

The coherent detector 25 coherently detects the received optical signal (4) output from the optical fiber amplifier 9. The receiving unit 24 decodes the received data (2) using the coherently detected received optical signal (4), the estimated value of the Doppler shift amount in the reception clock signal (8), and the reception clock signal (8). The receiving unit 24 is, for example, a DSP.

As illustrated in FIG. 11, the receiving unit 24 includes a sampling unit 241, an adaptive equalization unit 242, an SNR estimating unit 243, a frequency difference estimating unit 244, a frequency difference compensating unit 245, a phase difference estimating unit 246, a phase difference compensating unit 247, and a decoding unit 248. The sampling unit 241 samples the coherently detected received optical signal (4) at a symbol rate synchronized with the reception clock signal (8). For example, the sampling unit 241 samples the coherently detected signal at a symbol rate synchronized with the reception clock signal (8) or a rational multiple of the symbol rate.

The adaptive equalization unit 242 adaptively equalizes the signal sampled by the sampling unit 241. The adaptive equalization unit 242 performs equalization so that an error between an output signal point and an ideal signal point is minimized on average within a certain period of time. For example, when the modulation system is QuadraPhase-Shift Keying (QPSK), adaptive equalization can be achieved by a constant envelope algorithm.

The SNR estimating unit 243 estimates an SNR of the adaptively-equalized signal. For example, the SNR estimating unit 243 estimates an error amount by averaging errors from ideal signal points of the equalized signal within a certain period of time to estimate an SNR.

The frequency difference estimating unit 244 estimates the frequency difference in the adaptively-equalized signal using the signal adaptively equalized by the adaptive equalization unit 242, the estimated value of the SNR, and the Doppler shift amount estimated value. For example, in the frequency difference estimation processing, a plurality of samples are used to suppress the influence of noise, and sequential calculation using the plurality of samples is performed to average the estimated values. In a case where the frequency difference due to the Doppler shift changes while the SNR decreases due to the influence of atmospheric fluctuations of the optical signal, it takes time until the initial value of sequential calculation in the estimation of the frequency difference deviates from the true value and converges. In this case, the frequency difference cannot be compensated, and it takes time to recover the communication even if the SNR of the received optical signal is recovered.

Therefore, the optical transceiver 2A is hardly affected by the distortion of the wavefront due to the influence of atmospheric fluctuations, and the receiving unit 24 can stably calculate the change in the frequency difference due to the Doppler shift by estimating the Doppler shift amount from the stably supplied reception clock signal (8). Note that, the frequency difference is estimated from a signal obtained by adaptively equalizing the reception clock signal (8) since the wavelength of the light source itself changes due to the influence of temperature, for example, in addition to the Doppler shift. When the SNR of the received optical signal is recovered, the frequency difference is estimated from the signal obtained by adaptively equalizing the reception clock signal (8) with the frequency difference calculated using the estimated value of the Doppler shift amount as an initial value, so that the convergence of the estimated value is accelerated and the time until the communication is recovered is shortened.

In a case where the estimated value of the SNR estimated by the SNR estimating unit 243 is equal to or larger than the threshold, the frequency difference estimating unit 244 estimates the frequency difference of the adaptively-equalized signal. In a case where the estimated value of the SNR becomes equal to or larger than the threshold again after falling below the threshold, the frequency difference estimating unit 244 estimates the frequency difference of the adaptively-equalized signal using the estimated value of the frequency difference immediately before the estimated value of the SNR falls below the threshold and the estimated value of the frequency difference calculated on the basis of the transition of the estimated value of the Doppler shift amount after the estimated value of the SNR falls below the threshold as initial values.

For example, in a case where the estimated value of the SNR falls below the threshold when the estimated value of the frequency difference estimated from the adaptively-equalized signal is f0 (Hz) and the estimated value of the Doppler shift amount is d0, and then the estimated value of the SNR becomes equal to or larger than the threshold when the estimated value of the Doppler shift amount is d1, the initial value of the estimated value of the frequency difference is obtained by f0+fc (d1−d0). Here, fc is the frequency of the transmission optical signal.

The frequency difference compensating unit 245 compensates for the frequency difference of the adaptively-equalized signal on the basis of the frequency difference estimated by the frequency difference estimating unit 244. The phase difference estimating unit 246 estimates a phase difference in the signal whose frequency difference has been compensated by the frequency difference compensating unit 245. The phase difference compensating unit 247 compensates for the phase difference of the adaptively-equalized signal on the basis of the phase difference estimated by the phase difference estimating unit 246. For example, in a case where the modulation system is QPSK, the phase difference can be estimated and compensated by the method described in Reference Literature 1, for example, by using the Viterbi algorithm. Furthermore, the frequency difference estimating unit 244 can estimate the frequency difference of the adaptively-equalized signal by the method described in Reference Literature 2, and can also remove the phase modulation component by raising the QPSK signal to the fourth power. The decoding unit 248 decodes the signal in which the phase difference is compensated.

REFERENCE LITERATURE 1

A. Viterbi, "Nonlinear estimation of PSK-modulated carrier phase with application to burst digital transmission", in IEEE Transactions on Information Theory, vol. 29, no. 4, pp. 543-551, July 1983.

REFERENCE LITERATURE 2

A. Leven, et al., "Frequency Estimation in Intradyne Reception", IEEE Photonics Technology Letters, vol. 19, no. 6, pp. 366-368 (2007).

Figure 12:
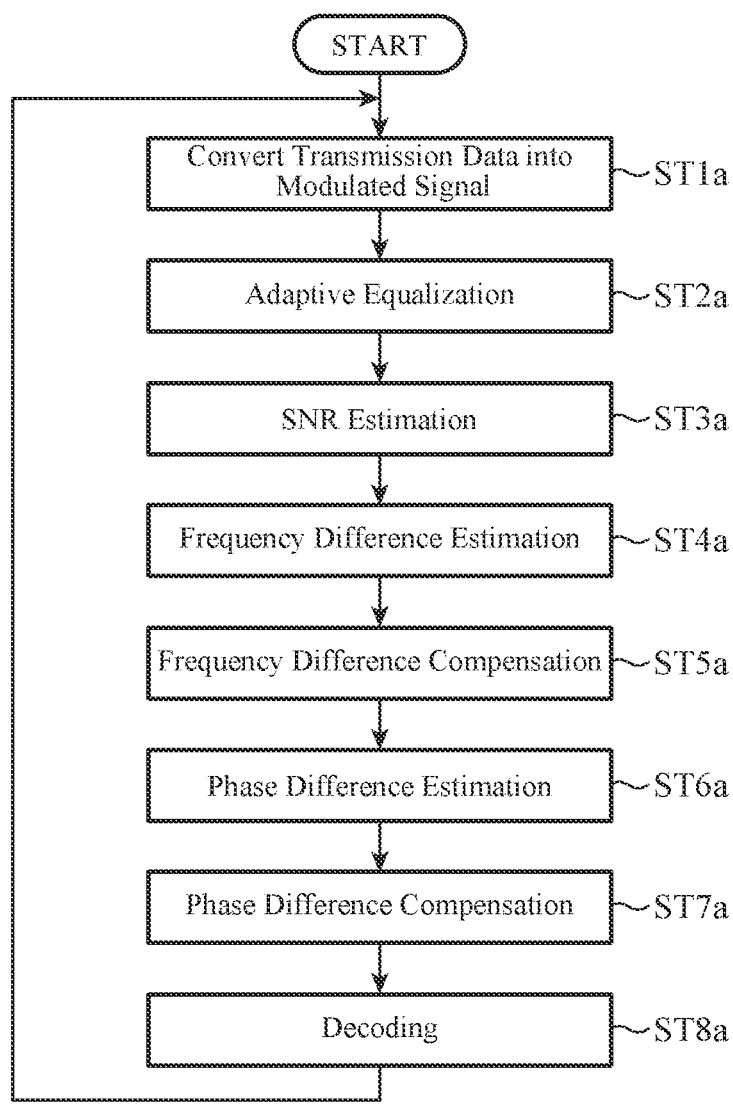
FIG. 12 is a flowchart illustrating operations of a transmission unit and a receiving unit included in an optical transceiver in the third embodiment.

FIG. 12 is a flowchart illustrating operations of the transmission unit 21 and the receiving unit 24.

The modulated signal conversion unit 211 converts the transmission data (1) input from the outside of the device or the ARQ control unit 10 into a signal modulated at a symbol rate synchronized with the transmission clock signal (5) (step ST1a). The modulated signal output from the transmission unit 21 is converted into a transmission optical signal (3) by the optical modulator 22 and output to the intensity modulation unit 4.

The received optical signal (4) received by the paired optical space communications transmission and reception terminal 1A or 1B is coherently detected by the coherent detector 25. The sampling unit 241 samples the coherently detected received optical signal (4) at a symbol rate synchronized with the reception clock signal (8). The adaptive equalization unit 242 adaptively equalizes the signal sampled by the sampling unit 241 (step ST2a).

The SNR estimating unit 243 estimates the SNR of the signal adaptively equalized by the adaptive equalization unit 242 (step ST3a). Subsequently, the frequency difference estimating unit 244 estimates the frequency difference in the adaptively-equalized signal using the signal adaptively equalized by the adaptive equalization unit 242, the estimated value of the SNR, and the Doppler shift amount estimated value (step ST4a). The frequency difference compensating unit 245 compensates for the frequency difference of the adaptively-equalized signal on the basis of the frequency difference estimated by the frequency difference estimating unit 244 (step ST5a).

Next, the phase difference estimating unit 246 estimates a phase difference in the signal whose frequency difference has been compensated by the frequency difference compensating unit 245 (step ST6a). The phase difference compensating unit 247 compensates for the phase difference of the adaptively-equalized signal on the basis of the phase difference estimated by the phase difference estimating unit 246 (step ST7a). Finally, the decoding unit 248 decodes the signal in which the phase difference has been compensated, and outputs the decoded data to the outside of the device or the ARQ control unit 10 as received data (2) (step ST8a).

Figure 13:
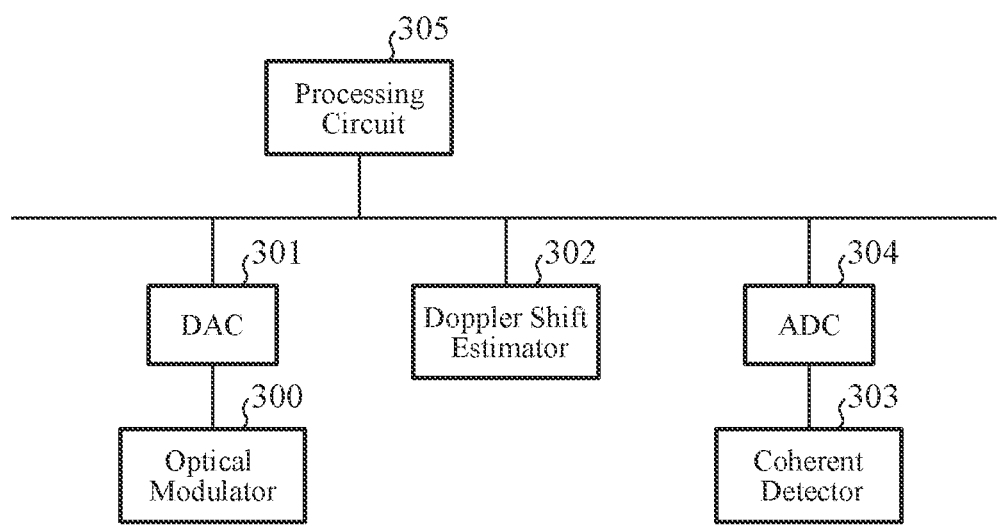
FIG. 13 is a block diagram illustrating a hardware configuration for implementing functions of the transmission unit and the receiving unit included in the optical transceiver in the third embodiment.
Figure 14:
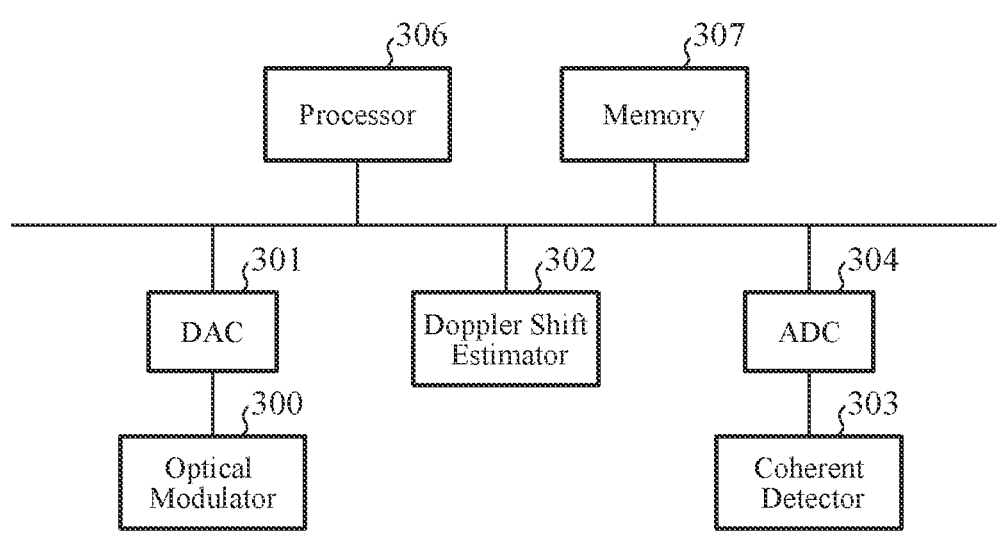
FIG. 14 is a block diagram illustrating a hardware configuration for executing software for implementing the functions of the transmission unit and the receiving unit included in the optical transceiver in the third embodiment.

FIG. 13 is a block diagram illustrating a hardware configuration for implementing the functions of the transmission unit 21 and the receiving unit 24. FIG. 14 is a block diagram illustrating a hardware configuration for executing software for implementing the functions of the transmission unit 21 and the receiving unit 24. In FIGS. 13 and 14, an optical modulator 300 is the optical modulator 22 illustrated in FIG. 11. The optical modulator 300 is connected to a processing circuit 305, a processor 306, and a memory 307 via a DA converter (DAC) 301. The DAC 301 converts a signal input to the optical modulator 300 from a digital signal to an analog signal. A Doppler shift estimator 302 is the Doppler shift estimator 23 illustrated in FIG. 11. A coherent detector 303 is the coherent detector 25 illustrated in FIG. 11. The coherent detector 303 is connected to the processing circuit 305, the processor 306, and the memory 307 via an AD converter (ADC) 304. The ADC 304 converts the signal output from the coherent detector 303 from an analog signal to a digital signal.

The functions of the transmission unit 21 and the receiving unit 24 included in the optical transceiver 2A are implemented by a processing circuit. That is, the optical transceiver 2A includes a processing circuit that executes processing from step ST1a to step ST8a illustrated in FIG. 12. The processing circuit may be dedicated hardware, or may be a CPU that executes a program stored in the memory.

In a case where the processing circuit is the processing circuit 305 of dedicated hardware illustrated in FIG. 13, the processing circuit 305 corresponds to, for example, a single circuit, a composite circuit, a programmed processor, a parallel programmed processor, ASIC, FPGA, or a combination thereof. The functions of the transmission unit 21 and the receiving unit 24 included in the optical transceiver 2A may be implemented by separate processing circuits, or these functions may be collectively implemented by one processing circuit.

In a case where the processing circuit is the processor 306 illustrated in FIG. 14, the functions of the transmission unit 21 and the receiving unit 24 included in the optical transceiver 2A are implemented by software, firmware, or a combination of software and firmware. Note that the software or firmware is described as a program and stored in the memory 307.

The processor 306 reads and executes the program stored in the memory 307 to implement the functions of the transmission unit 21 and the receiving unit 24 included in the optical transceiver 2A. For example, when executed by the processor 306, the optical transceiver 2A includes the memory 307 for storing a program by which the processing from step ST1a to step ST8a in the flowchart illustrated in FIG. 12 is executed as a result. These programs cause a computer to execute the procedures or methods performed by the transmission unit 21 and the receiving unit 24. The memory 307 may be a computer-readable storage medium storing a program for causing a computer to function as the transmission unit 21 and the receiving unit 24.

The memory 307 corresponds to, for example, a nonvolatile or volatile semiconductor memory such as RAM, ROM, a flash memory, EPROM, or EEPROM: a magnetic disk, a flexible disk, an optical disk, a compact disk, a mini disk, or DVD.

A part of the functions of the transmission unit 21 and the receiving unit 24 included in the optical transceiver 2A may be implemented by dedicated hardware, and the remaining part may be implemented by software or firmware. For example, the function of the transmission unit 21 is implemented by the processing circuit 305 that is dedicated hardware, and the function of the receiving unit 24 is implemented by the processor 306 reading and executing a program stored in the memory 307. Thus, the processing circuit can implement the above functions by hardware, software, firmware, or a combination thereof.

As described above, in the optical space communications transmission and reception terminal 1A or 1B according to the third embodiment, the receiving unit 24 samples the coherently detected received optical signal at the symbol rate synchronized with the reception clock signal, adaptively equalizes the sampled signal, estimates the SNR in the adaptively-equalized signal, estimates the frequency difference in the adaptively-equalized signal using the adaptively-equalized signal, the estimated value of the SNR, and the estimated value of the Doppler shift amount, compensates the frequency difference of the adaptively-equalized signal on the basis of the estimated frequency difference, estimates the phase difference in the signal in which the frequency difference is compensated, compensates the phase difference of the adaptively-equalized signal on the basis of the estimated phase difference, and outputs data obtained by decoding the signal in which the phase difference is compensated as received data.

When the optical space communications transmission and reception terminal 1A or 1B includes the optical transceiver 2A, the effects described in the first or second embodiment can be obtained. Furthermore, as described above, since the time for estimating the frequency difference of the reception clock signal (8) is shortened, the time until the communication is recovered when the SNR of the received optical signal is recovered is shortened.

In the optical space communications transmission and reception terminal 1A or 1B according to the third embodiment, the frequency difference estimating unit 244 estimates the frequency difference in the adaptively-equalized signal in a case where the SNR is equal to or larger than the threshold, and estimates the frequency difference in the adaptively-equalized signal using, as initial values, the estimated value of the frequency difference immediately before the SNR falls below the threshold and the estimated value of the frequency difference calculated on the basis of the transition of the estimated value of the Doppler shift amount after the SNR falls below the threshold when the SNR falls below the threshold and then becomes equal to or larger than the threshold again. As a result, since the time for estimating the frequency difference of the reception clock signal (8) is shortened, the time until the communication is recovered when the SNR of the received optical signal is recovered is shortened.

Note that combinations of each embodiments, modifications of any components of each of the embodiments, or omissions of any components in each of the embodiments are possible.

INDUSTRIAL APPLICABILITY

The optical space communications transmission and reception terminal according to the present disclosure can be used for a feeder link in a satellite communication network, for example.

REFERENCE SIGNS LIST

1: optical space communications system, 1A, 1B: optical space communications transmission and reception terminal, 2, 2A: optical transceiver, 3: transmission clock source, 4: intensity modulation unit, 5: fiber coupling unit, 6: tracking mirror, 7: beam splitter, 8, 8A: angle sensor, 9: optical fiber amplifier, 10: ARQ control unit, 11: low-speed receiver, 12: low-speed transmitter, 21: transmission unit, 22, 300: optical modulator, 23, 302: Doppler shift estimator, 24: receiving unit, 25, 303: coherent detector, 41: electro-optical converter, 42: optical multiplexer, 81, 85: lens, 83, 88: bandpass filter (BPF), 84: beam splitter, 87: photoelectric converter, 101: transmission buffer, 102: transmission data output unit, 103: reception buffer, 104: received frame output unit, 105: sequence missing determining unit, 106: retransmission request output unit, 200, 305: processing circuit, 201, 306: processor, 202, 307: memory, 211: modulated signal conversion unit, 241: sampling unit, 242: adaptive equalization unit, 243: SNR estimating unit, 244: frequency difference estimating unit, 245: frequency difference compensating unit, 246: phase difference estimating unit, 247: phase difference compensating unit, 248: decoding unit

The invention claimed is:

1. An optical space communications transmission and reception terminal that performs bidirectional communication with a pair of optical space communications transmission and reception terminals having a same configuration, the optical space communications transmission and reception terminal comprising:
    an optical transceiver to convert transmission data into a transmission optical signal modulated at a symbol rate synchronized with a transmission clock signal and output the transmission optical signal, and generate received data by demodulating and decoding a signal obtained by sampling a received optical signal at a cycle synchronized with a reception clock signal;
    an intensity modulator to generate a transmission optical signal obtained by superimposing a transmission clock signal on the transmission optical signal output from the optical transceiver and performing intensity modulation, and output the generated transmission optical signal;
    a transmission clock source to supply a common transmission clock signal to the optical transceiver and the intensity modulator;
    a fiber coupler to output an intensity-modulated transmission optical signal as collimated light and couple the input optical signal to an optical fiber;
    an optical fiber amplifier to amplify an optical signal coupled to the optical fiber by the fiber coupler and output the amplified optical signal to the optical transceiver as a received optical signal;
    a tracking mirror to output an optical signal propagated in space to a side of the fiber coupler, output the transmission optical signal collimated by the fiber coupler to the space, and output, when a propagation angle error is input, an optical signal in which a propagation angle is corrected on a basis of the input propagation angle error;
    a beam splitter to divide a part of an optical signal propagating between the tracking mirror and the fiber coupler; and
    an angle sensor to output a propagation angle error detected from the optical signal divided by the beam splitter to the tracking mirror, and output a clock signal extracted from the optical signal divided by the beam splitter to the optical transceiver as a reception clock signal.

2. The optical space communications transmission and reception terminal according to claim 1, wherein the angle sensor includes:
    a split type light receiving element to receive an optical signal on a light receiving surface divided into a plurality of pieces;
    a lens to condense an optical signal at a center position of the light receiving surface of the split type light receiving element; and
    a bandpass filter to use, as a pass band, a frequency band of a transmission clock signal from a pair of optical space communications transmission and reception terminals having the same configuration, and
    wherein the angle sensor
    detects a propagation angle error of an optical signal on a basis of a deviation between a condensing position of the optical signal and a center position of the split type light receiving element, and
    outputs a clock signal extracted by the bandpass filter to the optical transceiver as a reception clock signal.

3. An optical space communications transmission and reception terminal that performs bidirectional communication with a pair of optical space communications transmission and reception terminals having a same configuration, the optical space communications transmission and reception terminal comprising:
    an optical transceiver to convert transmission data into a transmission optical signal modulated at a symbol rate synchronized with a transmission clock signal and output the transmission optical signal, and generate received data by demodulating and decoding a signal obtained by sampling a received optical signal at a cycle synchronized with a reception clock signal;
    a low-speed transmitter to convert a retransmission request signal of a communication frame into a signal modulated at a symbol rate synchronized with a transmission clock signal and output the signal;
    a transmission clock source to supply a common transmission clock signal to the optical transceiver and the low-speed transmitter;
    an intensity modulator to generate a transmission optical signal obtained by superimposing a signal output from the low-speed transmitter on the transmission optical signal output from the optical transceiver and performing intensity modulation, and output the generated transmission optical signal;
    a fiber coupler to output an intensity-modulated transmission optical signal as collimated light and couple the input optical signal to an optical fiber;
    an optical fiber amplifier to amplify an optical signal coupled to the optical fiber by the fiber coupler and output the amplified optical signal to the optical transceiver as a received optical signal;
    a tracking mirror to output an optical signal propagated in space to a side of the fiber coupler, output the transmission optical signal collimated by the fiber coupler to the space, and output, when a propagation angle error is input, an optical signal in which a propagation angle is corrected on a basis of the input propagation angle error;
    a beam splitter to distribute a part of an optical signal propagating between the tracking mirror and the fiber coupler;
    an angle sensor to output an electrical signal indicating an intensity fluctuation of an optical signal distributed by the beam splitter;

a low-speed receiver to reproduce a clock signal synchronized with a symbol rate by demodulating and decoding the electrical signal output from the angle sensor, output the reproduced clock signal to the optical transceiver as a reception clock signal, and output the reproduced retransmission request signal when the retransmission request signal is reproduced by demodulating and decoding the electrical signal; and an ARQ controller to output a transmission frame input from the outside of the device to the optical transceiver as transmission data, output a transmission frame corresponding to a sequence number indicated by the retransmission request signal output from the low-speed receiver to the optical transceiver as transmission data, store received data output from the optical transceiver as a received frame, and output the retransmission request signal of a received frame corresponding to a missing sequence number to the low-speed transmitter in a case where the sequence number of the received frame is missing.

4. The optical space communications transmission and reception terminal according to claim 3, wherein the ARQ controller includes:

a transmission buffer to store input transmission frames in an order of sequence numbers;

a transmission data outputter to output a transmission frame read from the transmission buffer in an order of sequence numbers to the optical transceiver as transmission data;

a reception buffer to store the received data output from the optical transceiver in an order of sequence numbers as a received frame;

a received frame outputter to output the received frames stored in the reception buffer in an order of sequence numbers;

a determiner to determine whether or not missing has occurred in a sequence number of a received frame stored in the reception buffer; and a retransmission request outputter to output a retransmission request signal of a received frame corresponding to a missing sequence number to the low-speed transmitter when the determiner determines that missing has occurred in the sequence number.

5. The optical space communications transmission and reception terminal according to claim 1, wherein the optical transceiver includes:

a transmitter to convert transmission data into a signal modulated at a symbol rate synchronized with a transmission clock signal and output the signal;

an optical modulator to convert the modulated signal output from the transmitter into a transmission optical signal and output the transmission optical signal to the intensity modulator;

a Doppler shift estimator to estimate a Doppler shift amount of a reception clock signal;

a coherent detector to coherently detect a received optical signal; and a receiver to decode received data using the coherently detected received optical signal, the estimated value of the Doppler shift amount in the reception clock signal, and the reception clock signal, and wherein the receiver includes:

a sampler to sample the coherently detected received optical signal at a symbol rate synchronized with the reception clock signal;

an adaptive equalizer to adaptively equalize a sampled signal;

an SNR estimator to estimate a signal-to-noise ratio in an adaptively-equalized signal;

a frequency difference estimator to estimate a frequency difference in the adaptively-equalized signal using the signal adaptively equalized by the adaptive equalizer, the estimated value of the signal-to-noise ratio, and the estimated value of the Doppler shift amount;

a frequency difference compensator to compensate for a frequency difference of an adaptively-equalized signal on a basis of the frequency difference estimated by the frequency difference estimator;

a phase difference estimator to estimate a phase difference in a signal in which a frequency difference is compensated;

a phase difference compensator to compensate for a phase difference of an adaptively-equalized signal on a basis of the phase difference estimated by the phase difference estimator; and a decoder to decode a signal in which a phase difference is compensated, and output decoded data as received data.

6. The optical space communications transmission and reception terminal according to claim 2, wherein the optical transceiver includes:

a transmitter to convert transmission data into a signal modulated at a symbol rate synchronized with a transmission clock signal and output the signal;

an optical modulator to convert the modulated signal output from the transmitter into a transmission optical signal and output the transmission optical signal to the intensity modulator;

a Doppler shift estimator to estimate a Doppler shift amount of a reception clock signal;

a coherent detector to coherently detect a received optical signal; and a receiver to decode received data using the coherently detected received optical signal, the estimated value of the Doppler shift amount in the reception clock signal, and the reception clock signal, and wherein the receiver includes:

a sampler to sample the coherently detected received optical signal at a symbol rate synchronized with the reception clock signal;

an adaptive equalizer to adaptively equalize a sampled signal;

an SNR estimator to estimate a signal-to-noise ratio in an adaptively-equalized signal;

a frequency difference estimator to estimate a frequency difference in the adaptively-equalized signal using the signal adaptively equalized by the adaptive equalizer, the estimated value of the signal-to-noise ratio, and the estimated value of the Doppler shift amount;

a frequency difference compensator to compensate for a frequency difference of an adaptively-equalized signal on a basis of the frequency difference estimated by the frequency difference estimator;

a phase difference estimator to estimate a phase difference in a signal in which a frequency difference is compensated;

a phase difference compensator to compensate for a phase difference of an adaptively-equalized signal on a basis of the phase difference estimated by the phase difference estimator; and a decoder to decode a signal in which a phase difference is compensated, and output decoded data as received data.

7. The optical space communications transmission and reception terminal according to claim 3, wherein the optical transceiver includes:
- a transmitter to convert transmission data into a signal modulated at a symbol rate synchronized with a transmission clock signal and output the signal;
- an optical modulator to convert the modulated signal output from the transmitter into a transmission optical signal and output the transmission optical signal to the intensity modulator;
- a Doppler shift estimator to estimate a Doppler shift amount of a reception clock signal;
- a coherent detector to coherently detect a received optical signal; and
- a receiver to decode received data using the coherently detected received optical signal, the estimated value of the Doppler shift amount in the reception clock signal, and the reception clock signal, and wherein the receiver includes:
- a sampler to sample the coherently detected received optical signal at a symbol rate synchronized with the reception clock signal;
- an adaptive equalizer to adaptively equalize a sampled signal;
- an SNR estimator to estimate a signal-to-noise ratio in an adaptively-equalized signal;
- a frequency difference estimator to estimate a frequency difference in the adaptively-equalized signal using the signal adaptively equalized by the adaptive equalizer, the estimated value of the signal-to-noise ratio, and the estimated value of the Doppler shift amount;
- a frequency difference compensator to compensate for a frequency difference of an adaptively-equalized signal on a basis of the frequency difference estimated by the frequency difference estimator;
- a phase difference estimator to estimate a phase difference in a signal in which a frequency difference is compensated;
- a phase difference compensator to compensate for a phase difference of an adaptively-equalized signal on a basis of the phase difference estimated by the phase difference estimator; and
- a decoder to decode a signal in which a phase difference is compensated, and output decoded data as received data.

8. The optical space communications transmission and reception terminal according to claim 4, wherein the optical transceiver includes:
- a transmitter to convert transmission data into a signal modulated at a symbol rate synchronized with a transmission clock signal and output the signal;
- an optical modulator to convert the modulated signal output from the transmitter into a transmission optical signal and output the transmission optical signal to the intensity modulator;
- a Doppler shift estimator to estimate a Doppler shift amount of a reception clock signal;
- a coherent detector to coherently detect a received optical signal; and
- a receiver to decode received data using the coherently detected received optical signal, the estimated value of the Doppler shift amount in the reception clock signal, and the reception clock signal, and wherein the receiver includes:
- a sampler to sample the coherently detected received optical signal at a symbol rate synchronized with the reception clock signal;
- an adaptive equalizer to adaptively equalize a sampled signal;
- an SNR estimator to estimate a signal-to-noise ratio in an adaptively-equalized signal;
- a frequency difference estimator to estimate a frequency difference in the adaptively-equalized signal using the signal adaptively equalized by the adaptive equalizer, the estimated value of the signal-to-noise ratio, and the estimated value of the Doppler shift amount;
- a frequency difference compensator to compensate for a frequency difference of an adaptively-equalized signal on a basis of the frequency difference estimated by the frequency difference estimator;
- a phase difference estimator to estimate a phase difference in a signal in which a frequency difference is compensated;
- a phase difference compensator to compensate for a phase difference of an adaptively-equalized signal on a basis of the phase difference estimated by the phase difference estimator; and
- a decoder to decode a signal in which a phase difference is compensated, and output decoded data as received data.

9. The optical space communications transmission and reception terminal according to claim 5, wherein the frequency difference estimator estimates a frequency difference in an adaptively-equalized signal in a case where the signal-to-noise ratio is equal to or greater than a threshold, and estimates a frequency difference in the adaptively-equalized signal using, as an initial value, an estimated value of a frequency difference immediately before the signal-to-noise ratio falls below the threshold and an estimated value of a frequency difference calculated on a basis of a transition of an estimated value of the Doppler shift amount after the signal-to-noise ratio falls below the threshold in a case where the signal-to-noise ratio falls below the threshold and then becomes equal to or greater than the threshold again.

10. The optical space communications transmission and reception terminal according to claim 6, wherein the frequency difference estimator estimates a frequency difference in an adaptively-equalized signal in a case where the signal-to-noise ratio is equal to or greater than a threshold, and estimates a frequency difference in the adaptively-equalized signal using, as an initial value, an estimated value of a frequency difference immediately before the signal-to-noise ratio falls below the threshold and an estimated value of a frequency difference calculated on a basis of a transition of an estimated value of the Doppler shift amount after the signal-to-noise ratio falls below the threshold in a case where the signal-to-noise ratio falls below the threshold and then becomes equal to or greater than the threshold again.

11. The optical space communications transmission and reception terminal according to claim 7, wherein the frequency difference estimator estimates a frequency difference in an adaptively-equalized signal in a case where the signal-to-noise ratio is equal to or greater than a threshold, and estimates a frequency difference in the adaptively-equalized signal using, as an initial value, an estimated value of a frequency difference immediately before the signal-to-noise ratio falls below the threshold and an estimated value of a frequency difference calculated on a basis of a transition of an estimated value of the Doppler shift amount after the signal-to-noise ratio falls below the threshold in a case where the signal-to-noise ratio falls below the threshold and then becomes equal to or greater than the threshold again.

12. The optical space communications transmission and reception terminal according to claim 8, wherein the frequency difference estimator estimates a frequency difference in an adaptively-equalized signal in a case where the signal-to-noise ratio is equal to or greater than a threshold, and estimates a frequency difference in the adaptively-equalized signal using, as an initial value, an estimated value of a frequency difference immediately before the signal-to-noise ratio falls below the threshold and an estimated value of a frequency difference calculated on a basis of a transition of an estimated value of the Doppler shift amount after the signal-to-noise ratio falls below the threshold in a case where the signal-to-noise ratio falls below the threshold and then becomes equal to or greater than the threshold again.

13. An optical space communications system, comprising the optical space communications transmission and reception terminal according to claim 1, wherein
  bidirectional communication is performed between a pair of optical space communications transmission and reception terminals having a same configuration.

14. An optical space communications system, comprising the optical space communications transmission and reception terminal according to claim 3, wherein
  bidirectional communication is performed between a pair of optical space communications transmission and reception terminals having a same configuration.

\* \* \* \* \*